(12) United States Patent　　(10) Patent No.: US 12,600,101 B2
Kaneta et al.　　(45) Date of Patent: Apr. 14, 2026

---

(54) MANUFACTURING METHOD OF OPTICAL WAVEGUIDE

(71) Applicant: SUMITOMO BAKELITE CO., LTD., Tokyo (JP)

(72) Inventors: Motoya Kaneta, Tokyo (JP); Hirotake Imai, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 32 days.

(21) Appl. No.: 18/681,522

(22) PCT Filed: Oct. 19, 2022

(86) PCT No.: PCT/JP2022/038856
§ 371 (c)(1),
(2) Date: Feb. 6, 2024

(87) PCT Pub. No.: WO2023/074482
PCT Pub. Date: May 4, 2023

(65) Prior Publication Data
US 2024/0367399 A1　　Nov. 7, 2024

(30) Foreign Application Priority Data

Oct. 26, 2021　(JP) ................................. 2021-175057

(51) Int. Cl.
*B29D 11/00*　　(2006.01)
*B32B 27/08*　　(2006.01)
(Continued)

(52) U.S. Cl.
CPC .... *B29D 11/00663* (2013.01); *B29D 11/0073* (2013.01); *B32B 27/08* (2013.01);
(Continued)

(58) Field of Classification Search
CPC .......... B29D 11/00663; B29D 11/0073; B32B 27/08; G02B 6/13
See application file for complete search history.

(56) References Cited

U.S. PATENT DOCUMENTS

| 11,175,452 B1 | 11/2021 | Hsu et al. |
| 2008/0013903 A1 | 1/2008 | Fujii et al. |

(Continued)

FOREIGN PATENT DOCUMENTS

| JP | 2003-279777 | 10/2003 |
| JP | 2006-276481 | 10/2006 |

(Continued)

OTHER PUBLICATIONS

International Search Report and Written Opinion for International Application No. PCT/JP2022/038856 mailed on Jan. 10, 2023, 11 pages.

*Primary Examiner* — Mathieu D Vargot
(74) *Attorney, Agent, or Firm* — Amin, Turocy & Watson, LLP

(57) ABSTRACT

The manufacturing method of an optical waveguide of the present invention includes a step of preparing a workpiece which includes a core layer including a core portion-forming region and has a sheet shape and a step of cutting out an optical waveguide from an inside of the core portion-forming region in the workpiece. The core layer satisfies all of the following requirements (a), (b), and (c).
(a) the core layer contains a polymer and a monomer, and has a refractive index distribution based on a difference in concentration of the monomer or a difference in concentration of a structure derived from the monomer.
(b) the core portion-forming region includes a plurality of first core portions, second core portions provided on both sides of the first core portion, and a first side cladding portion provided between the first core portion (Continued)

and the second core portion, and the core portion-forming region is defined as that a plurality of the second core portions are positioned at an outer edge of the core portion-forming region.

(c) the core portion-forming region is a region where a total area ratio occupied by the first core portion and the second core portion is 50% or more in a 1 mm-square range.

12 Claims, 19 Drawing Sheets

(51) Int. Cl.
  *G02B 6/13* (2006.01)
  *B29K 105/00* (2006.01)
(52) U.S. Cl.
  CPC ........ *G02B 6/13* (2013.01); *B29K 2105/0002* (2013.01); *B32B 2250/24* (2013.01); *B32B*

2250/40 (2013.01); *B32B 2307/418* (2013.01); *B32B 2551/00* (2013.01)

(56) References Cited

U.S. PATENT DOCUMENTS

| | | | |
|---|---|---|---|
| 2010/0040337 A1 | 2/2010 | Suzuki et al. |
| 2010/0247030 A1 | 9/2010 | Furuyama |
| 2013/0286614 A1 | 10/2013 | Tan et al. |
| 2017/0235047 A1 | 8/2017 | Kitazoe et al. |

FOREIGN PATENT DOCUMENTS

| | | |
|---|---|---|
| JP | 2008-020722 | 1/2008 |
| JP | 2010-044279 | 2/2010 |
| JP | 2010-232319 | 10/2010 |
| JP | 2014-002218 | 1/2014 |
| JP | 2015-108819 | 6/2015 |
| JP | 2017-016017 | 1/2017 |
| JP | 2018-084696 | 5/2018 |
| WO | 2016/021505 | 2/2016 |

FIG. 9G
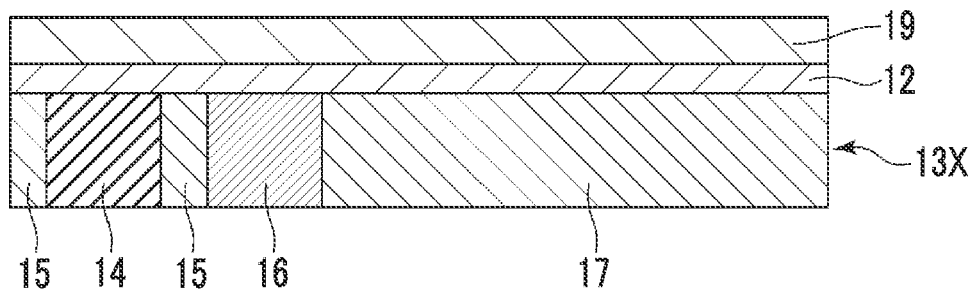
FIG. 9H
FIG. 9I
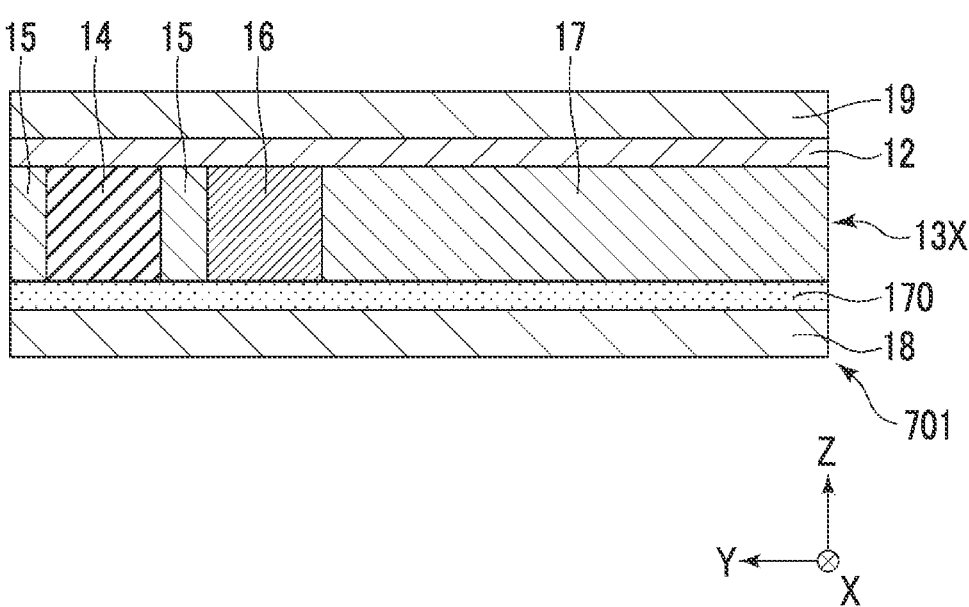

MANUFACTURING METHOD OF OPTICAL WAVEGUIDE

TECHNICAL FIELD

The present invention relates to a manufacturing method of an optical waveguide.

BACKGROUND ART

PTL 1 discloses a manufacturing method of an optical waveguide film, including a step of preparing an optical waveguide sheet and a step of cutting out a long optical waveguide film from the optical waveguide sheet. In addition, it is disclosed that the optical waveguide sheet has a core layer including a plurality of core portions and two cladding layers sandwiching the core layer, and the core layer is formed through a step of applying a composition for forming a core layer to obtain a coating film, a step of irradiating the obtained coating film with an active light beam such as ultraviolet rays, and a step of heating the coating film in an oven. In particular, it is disclosed that the composition for forming a core layer contains a polymer and a monomer. In addition, it is disclosed that the monomer moves in an in-plane direction orthogonal to a film thickness in the core layer during the irradiation with the active light beam and generates a difference in refractive index between an irradiated region and a non-irradiated region.

CITATION LIST

Patent Literature

[PTL 1] Japanese Unexamined Patent Application, First Publication No. 2018-084696

SUMMARY OF INVENTION

Technical Problem

In the manufacturing method of an optical waveguide film disclosed in PTL 1, the difference in refractive index between the irradiated region and the non-irradiated region is generated by moving the monomer. The present inventors have found that, in a case where the difference in refractive index is generated by such a principle, in a region where a density of a boundary line between the irradiated region and the non-irradiated region is high, the difference in refractive index through the boundary line tends to be larger than that in a region where the density of the boundary line is low.

Therefore, in a case where arrangement of the boundary line between the irradiated region and the non-irradiated region is not particularly taken into consideration, there is a concern that a variation of the difference in refractive index through the boundary line may be large.

In the manufacturing method of an optical waveguide film disclosed in PTL 1, in a case of manufacturing the optical waveguide sheet, the density of the boundary line between the irradiated region and the non-irradiated region is not particularly taken into consideration. Therefore, in the plurality of core portions included in the optical waveguide sheet, there is a concern that a variation of a difference in refractive index between adjacent clad portions may occur. In addition, PTL 1 discloses that the optical waveguide film is cut out from the optical waveguide sheet, but does not disclose a positional relationship between a cutting line and the core portion. Therefore, depending on a cutting position, there is a concern that an optical waveguide film having a plurality of core portions, having the variation of the difference in refractive index between adjacent clad portions, may be manufactured. The variation of the difference in refractive index causes a transmission loss between the core portions to vary.

An object of the present invention is to provide a manufacturing method of an optical waveguide, which is capable of manufacturing an optical waveguide in which a variation of a transmission loss between channels is small.

Solution to Problem

Such an object is achieved by the present invention of the following (1) to (8).

(1) A manufacturing method of an optical waveguide, including:
a step of preparing a workpiece which includes a core layer including a core portion-forming region and has a sheet shape; and
a step of cutting out an optical waveguide from an inside of the core portion-forming region in the workpiece,
in which the core layer satisfies all of the following requirements (a), (b), and (c),
(a) the core layer contains a polymer and a monomer, and has a refractive index distribution based on a difference in concentration of the monomer or a difference in concentration of a structure derived from the monomer,
(b) the core portion-forming region includes a plurality of first core portions, second core portions provided on both sides of the first core portion, and a first side cladding portion provided between the first core portion and the second core portion, and the core portion-forming region is defined as that a plurality of the second core portions are positioned at an outer edge of the core portion-forming region,
(c) the core portion-forming region is a region where a total area ratio occupied by the first core portion and the second core portion is 50% or more in a 1 mm-square range.

(2) The manufacturing method of an optical waveguide according to (1),
in which a width of at least one end portion of the second core portion is different from a width of the first core portion.

(3) The manufacturing method of an optical waveguide according to (1) or (2),
in which the optical waveguide has a first mark provided at a position overlapping the core portion-forming region.

(4) The manufacturing method of an optical waveguide according to (3),
in which the first mark has a low-refractive-index portion having a refractive index lower than a refractive index of the second core portion.

(5) The manufacturing method of an optical waveguide according to any one of (1) to (4),
in which the core layer includes a plurality of the core portion-forming regions which are separated from each other, and a blank region which is positioned between adjacent core portion-forming regions and does not satisfy the requirement (c).

(6) The manufacturing method of an optical waveguide according to (5),
in which the blank region is further provided to surround the core portion-forming regions.

(7) The manufacturing method of an optical waveguide according to (5) or (6), in which the optical waveguide has a second mark provided at a position overlapping the blank region.

(8) The manufacturing method of an optical waveguide according to (7), in which the blank region includes a second side cladding portion integrated with the first side cladding portion, and the second mark has a high-refractive-index portion having a refractive index higher than a refractive index of the second side cladding portion.

Advantageous Effects of Invention

According to the present invention, it is possible to manufacture an optical waveguide in which a variation of a transmission loss between channels is small.

BRIEF DESCRIPTION OF DRAWINGS

FIGS. 9G to 9I are cross-sectional views for explaining the manufacturing method of an optical waveguide according to the comparative example.

DESCRIPTION OF EMBODIMENTS

Hereinafter, the manufacturing method of an optical waveguide according to the present invention will be described in detail based on suitable embodiments shown in the accompanying drawings.

Figure 1:
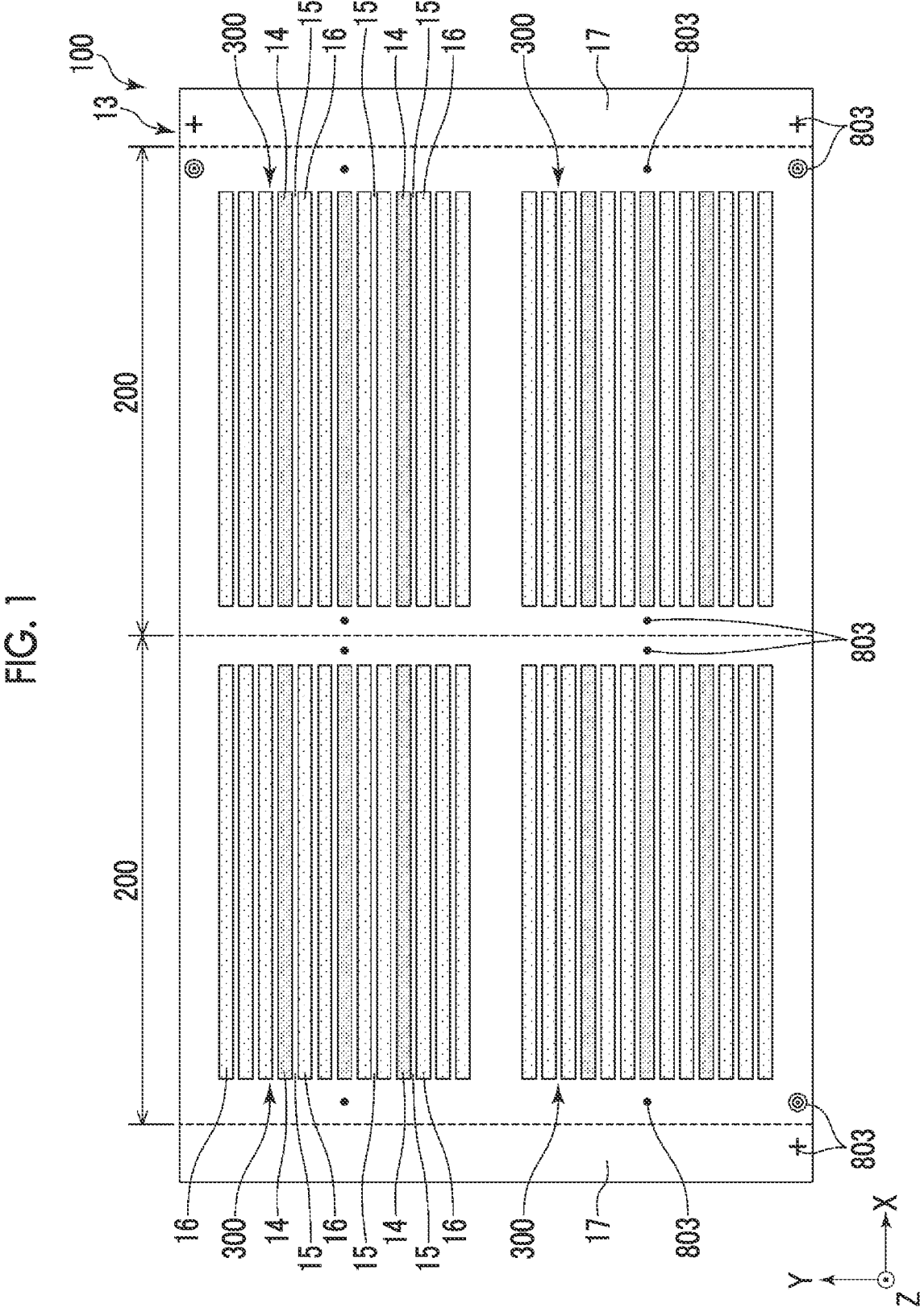
FIG. 1 is a plan view showing a workpiece used in the manufacturing method of an optical waveguide according to an embodiment.
Figure 2:
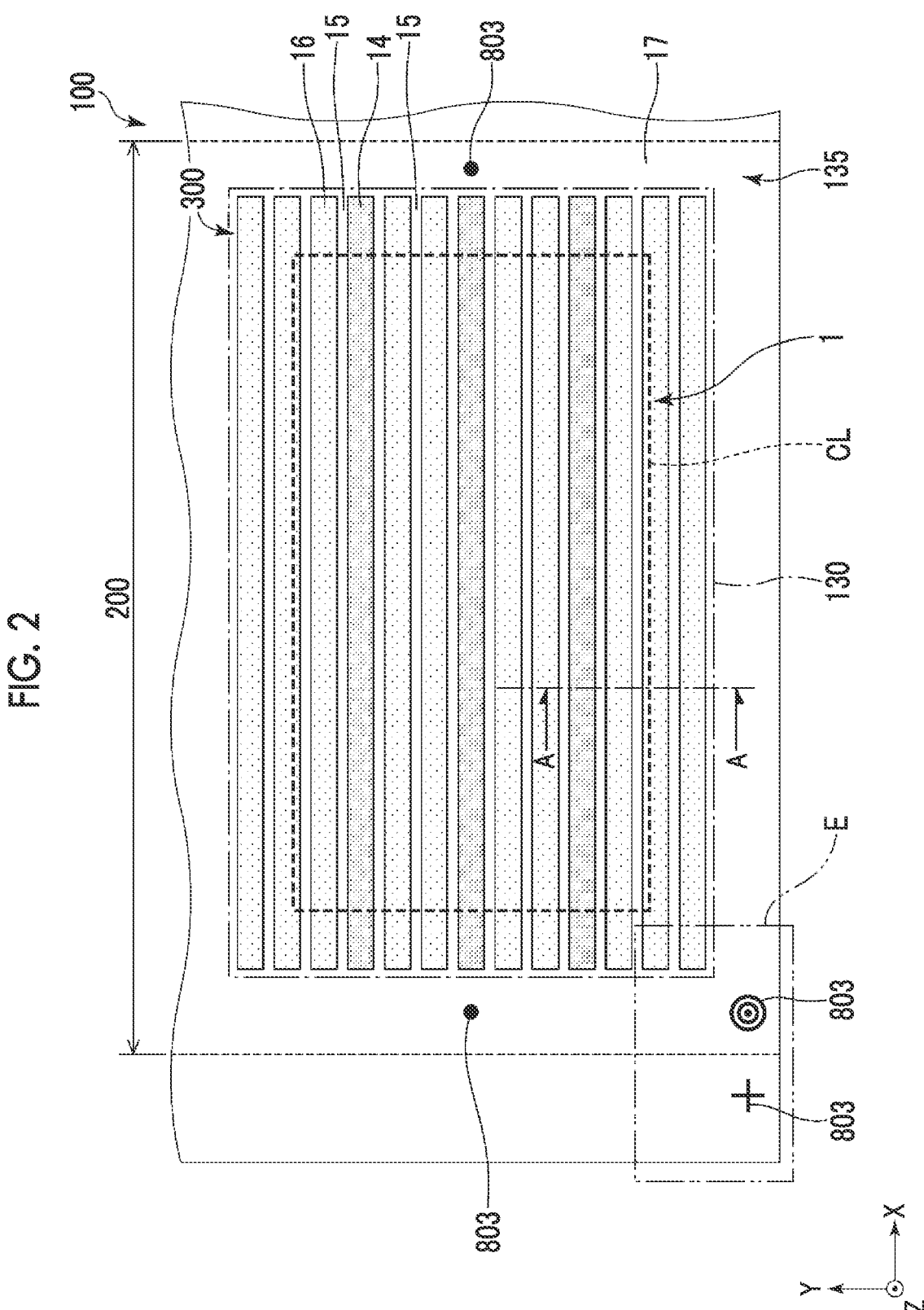
FIG. 2 is a partially enlarged view of FIG. 1.
Figures 3, 4:
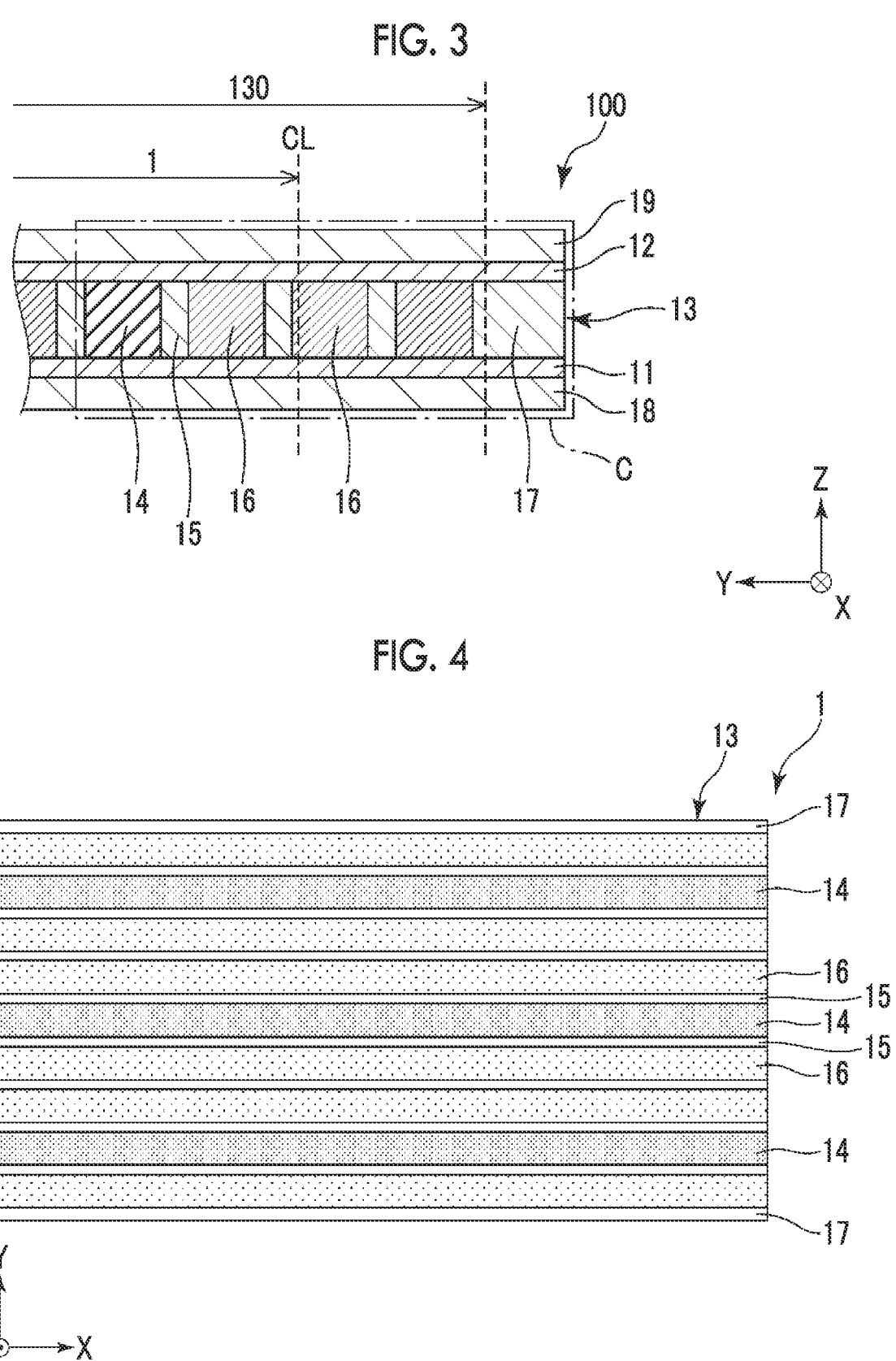
FIG. 3 is a cross-sectional view taken along a line A-A of FIG. 2.
FIG. 4 is a plan view showing an example of an optical waveguide cut out from an inside of a core portion-forming region in the workpiece shown in FIG. 2.

FIG. 1 is a plan view showing a workpiece used in the manufacturing method of an optical waveguide according to the embodiment. FIG. 2 is a partially enlarged view of FIG. 1. FIG. 3 is a cross-sectional view taken along a line A-A of FIG. 2.

In each of the drawings of the present application, the X-axis, the Y-axis, and the Z-axis are set as three axes orthogonal to each other, and are indicated by arrows. In addition, a tip end side of the arrow is referred to as "plus side", and a base end side thereof is referred to as "minus side". Furthermore, a tip end side of an arrow representing the Z-axis is referred to as "up", and a base end side thereof is referred to as "down".

1. Workpiece

A workpiece 100 shown in FIG. 1 is a member used for manufacturing an optical waveguide 1 shown in FIG. 2, has a sheet shape, and has two units 200. Each unit 200 has two pieces 300. One optical waveguide 1 can be cut out from the piece 300. Therefore, the workpiece 100 is a member from which four optical waveguides 1 can be manufactured at one time. The number of optical waveguides 1 which can be manufactured at one time is not particularly limited as long as it is one or more. In addition, the number of units 200 is not limited.

1.1. Structure

FIG. 2 is an enlarged view of a vicinity of one piece 300 in the workpiece 100.

As shown in FIG. 2, the piece 300 has three waveguide core portions 14 (first core portions), ten dummy core portions 16 (second core portions), and twelve first side cladding portions 15. Each of the portions has a long shape, extends along the X-axis, and is arranged along the Y-axis. In the following description, both the waveguide core portion 14 and the dummy core portion 16 may be simply referred to as "core portion". In addition, the number of the core portions included in the piece 300 is not particularly limited, the number of the waveguide core portions 14 may be two or more, and the number of the dummy core portions 16 may be three or more.

The first side cladding portion 15 is adjacent to both sides of each waveguide core portion 14 in the Y-axis direction. Similarly, the first side cladding portion 15 is adjacent to both sides of the dummy core portion 16 in the Y-axis direction. Therefore, the first side cladding portion 15 is disposed between the core portions. In addition, a second side cladding portion 17 having a frame shape is provided to surround these portions. In the following description, both the first side cladding portion 15 and the second side cladding portion 17 may be simply referred to as "side cladding portion".

The dummy core portions 16 are adjacent to each other on both sides of each waveguide core portion 14 through the first side cladding portion 15. An optical signal is incident on the waveguide core portion 14, and the optical signal is transmitted along the Y-axis. Accordingly, optical communication is possible through the waveguide core portion 14. The dummy core portion 16 is provided adjacent to the waveguide core portion 14, so that an increase in transmission loss, which is likely to occur in a case where a distance between the waveguide core portions 14 is too wide, is suppressed. That is, the dummy core portion 16 has a function of increasing a transmission efficiency in the waveguide core portion 14, instead of transmitting the optical signal. Two or more dummy core portions 16 may be provided between the waveguide core portions 14. In addition, the dummy core portion 16 may be used for receiving and transmitting the optical signal.

In the piece 300 shown in FIG. 1, the waveguide core portion 14 is not disposed at both end portions in the Y-axis direction, and three dummy core portions 16 are arranged through the first side cladding portion 15. Accordingly, even in a case where a difference in refractive index between the core portion and the first side cladding portion 15 is small at the end portion of the piece 300, the influence can be prevented from reaching the optical waveguide 1 cut out from the piece 300. This principle will be described in detail later.

As shown in FIG. 3, the workpiece 100 has a laminated structure in which a first cover layer 18, a first cladding layer 11, a core layer 13, a second cladding layer 12, and a second cover layer 19 are laminated in this order. Each layer of the laminated structure extends along an X-Y plane. The workpiece 100 is a resin film and has flexibility. FIGS. 1 and 2 are plan views of the workpiece 100 as viewed from above, and are views in which the core layer 13 is seen through the second cover layer 19 and the second cladding layer 12.

The above-described waveguide core portion 14, dummy core portion 16, first side cladding portion 15, and second side cladding portion 17 are provided in the core layer 13. Therefore, the core portion is surrounded by the first side cladding portion 15, the second side cladding portion 17, the first cladding layer 11, and the second cladding layer 12, and light can be confined inside the core portion.

Here, the core layer 13 satisfies the following requirement (a).

> (a) the core layer 13 contains a polymer and a monomer, and has a refractive index distribution based on a difference in concentration of the monomer or a difference in concentration of a structure derived from the monomer.

The refractive index distribution means that there are a portion having a high refractive index and a portion having a low refractive index. In the present embodiment, the refractive index of the polymer is different from the refractive index of the monomer or the refractive index of the structure derived from the monomer. In the present embodiment, the latter refractive index is lower than the former refractive index. Therefore, the refractive index distribution is formed in association with a difference in concentration. The waveguide core portion 14, the dummy core portion 16, the first side cladding portion 15, and the second side cladding portion 17 are formed in the core layer 13 in correspondence with the refractive index distribution.

Each portion in the core layer 13 may be formed based on a difference in refractive index of constituent materials. For example, the refractive index distribution can be formed in the core layer 13 by making the constituent materials of the core portion 14 and the side cladding portion different from each other. In addition, as a constituent material of the core layer 13, a method of using a polymer having a detachable group (a detachable pendant group) which is branched from a main chain and in which at least a part of a molecular structure thereof can be detached from the main chain by irradiation with active radiation can be used. In such a method, since the refractive index of the polymer is reduced by the detachment of the detachable group, the polymer can form a difference in refractive index depending on whether or not the polymer is irradiated with active radiation, and can form the refractive index distribution in the core layer 13. There are various methods as a method for forming the refractive index distribution in the core layer 13, but in the present embodiment, the core layer 13 contains a polymer and a monomer, and has a refractive index distribution based on a difference in concentration of the monomer or a difference in concentration of a structure derived from the monomer.

Widths of the waveguide core portions 14 in the Y-axis direction and widths of the dummy core portions 16 in the Y-axis direction may be the same as each other or may be different from each other. In addition, the width of the waveguide core portion 14 in the Y-axis direction and the width of the first side cladding portion 15 may be the same or different from each other.

Furthermore, the waveguide core portion 14 may branch in the middle or may intersect with another waveguide core portion 14 in the middle. In addition, the dummy core portion 16 may branch in the middle, may intersect with other dummy core portions 16 in the middle, or may be interrupted in the middle.

The total length of the workpiece 100 in the X-axis direction is not particularly limited, but is preferably approximately 100 to 3000 mm and more preferably approximately 500 to 2000 mm. The total width of the workpiece 100 in the Y-axis direction is also not particularly limited, but is preferably approximately 10 to 500 mm and more preferably approximately 50 to 200 mm.

A film thickness of the core layer 13 in the Z-axis direction is not particularly limited, but is preferably approximately 1 to 200 μm, more preferably approximately 5 to 100 μm, and still more preferably approximately 10 to 70 μm. Accordingly, optical characteristics and mechanical strength required for the core layer 13 are ensured.

Film thicknesses of the first cladding layer 11 and the second cladding layer 12 in the Z-axis direction are each preferably approximately 1 to 200 μm, more preferably approximately 3 to 100 μm, and still more preferably approximately 5 to 60 μm. Accordingly, optical characteristics and mechanical strength required for the first cladding layer 11 and the second cladding layer 12 are ensured.

The first cover layer 18 is laminated on a lower surface of the first cladding layer 11. The second cover layer 19 is laminated on an upper surface of the second cladding layer 12. Accordingly, it is possible to improve mechanical characteristics and durability of the workpiece 100.

A film thickness of the workpiece 100 in the Z-axis direction is preferably 50 to 300 μm, more preferably 60 to 200 μm, and still more preferably 70 to 150 μm. Accordingly, it is possible to sufficiently secure the mechanical strength of the workpiece 100 while increasing the flexibility of the workpiece 100.

1.2. Core Portion-Forming Region

The core layer 13 includes a core portion-forming region 130 shown in FIG. 2. The core portion-forming region 130 is a region which satisfies the following requirements (b) and (c).

> (b) the core portion-forming region 130 includes a plurality of waveguide core portions 14 (first core portions), dummy core portions 16 (second core portions) provided on both sides of the waveguide core portion 14, and a first side cladding portion 15 provided between the waveguide core portion 14 and the dummy core portion 16, and the core portion-forming region 130 is defined as that a plurality of the dummy core portions 16 (second core portions) are positioned at an outer edge of the core portion-forming region 130.

(c) the core portion-forming region 130 is a region where the total area ratio occupied by the waveguide core portion 14 and the dummy core portion 16 is 50% or more in a 1 mm-square range.

The core layer 13 shown in FIG. 2 has the waveguide core portion 14, the dummy core portion 16, the first side cladding portion 15, and the second side cladding portion 17. The core portion-forming region 130 can be said to be a region where, in the core layer 13, a plurality of the dummy core portions 16 (second core portions) are positioned on the outer edge of the core portion-forming region 130, and the core portions are disposed at a high density so that the area ratio is 50% or more. In other words, the core portion-forming region 130 can be said to be a region where a plurality of the dummy core portions 16 (second core portions) are positioned on both sides (plus side and minus side of the Y-axis) thereof and a boundary line between the core portion and the side cladding portion is disposed at a high density. Specifically, in a case where a square having a side of 1 mm is scanned in the core layer 13, a scanning range in which the area ratio occupied by the core portions in the square is 50% or more can be set to the core portion-forming region 130. In a cutting step S108 described later, the optical waveguide 1 is cut out from the inside of the core portion-forming region 130 of the workpiece 100. FIG. 2 shows an example of a cutting line CL, but the cutting line CL is located inside the core portion-forming region 130 as shown in FIG. 2.

1.3. Optical Waveguide

FIG. 4 is a plan view showing an example of the optical waveguide 1 cut out from an inside of the core portion-forming region 130 in the workpiece 100 shown in FIG. 2.

The optical waveguide 1 shown in FIG. 4 has three waveguide core portions 14, six dummy core portions 16, eight first side cladding portions 15, and two second side cladding portions 17. Such an optical waveguide 1 is connected to, for example, another optical component and is used for constructing an optical wiring.

An optical connector (ferrule) (not shown) may be mounted on at least one of both end portions of the optical waveguide 1. The optical waveguide 1 and another optical component can be fixed and optically connected to each other through the optical connector. In addition, the optical waveguide 1 may have a mirror which converts an optical path of light passing through the waveguide core portion 14. By converting the optical path through the mirror, the waveguide core portion 14 and the optical component provided outside the optical waveguide 1 can be optically connected. A bent waveguide may be used instead of the mirror.

2. Problems to be Solved by Present Embodiment

Next, the problems to be solved by the present embodiment will be described by describing a manufacturing method of an optical waveguide according to a comparative example.

Figure 5:
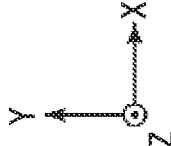
FIG. 5 is a plan view for explaining a manufacturing method of an optical waveguide according to a comparative example.
Figure 6:
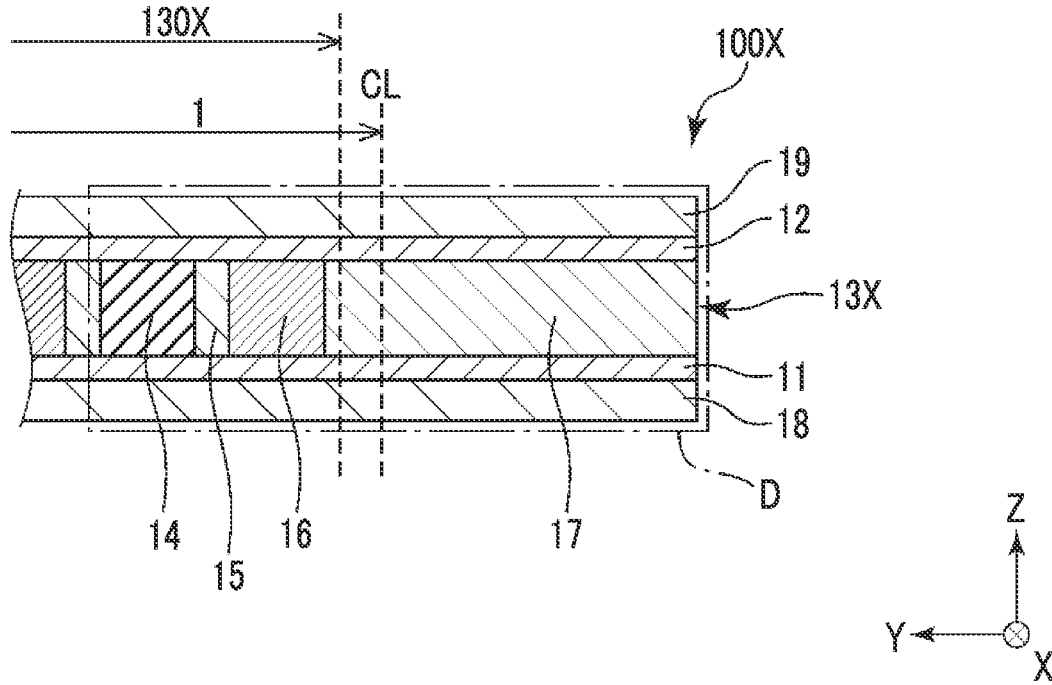
FIG. 6 is a cross-sectional view taken along a line B-B of FIG. 5.

FIG. 5 is a plan view for explaining the manufacturing method of an optical waveguide according to the comparative example. FIG. 6 is a cross-sectional view taken along a line B-B of FIG. 5. FIGS. 7 to 10 are cross-sectional views for explaining the manufacturing method of an optical waveguide according to the comparative example. In FIGS. 5 to 10, for convenience of description, the same reference numerals are given to the same configurations as those in the present embodiment. In addition, FIGS. 7 to 10 correspond to an enlarged view of a part D of FIG. 6.

A workpiece 100X shown in FIG. 5 is basically the same as the workpiece 100 in the present embodiment, except that a size of a core portion-forming region 130X for comparison is narrower than the core portion-forming region 130 of the workpiece 100 described above, and a plurality of dummy core portions 16 (second core portions) are not positioned on the outer edge of the core portion-forming region 130X for comparison. Accordingly, in the workpiece 100X, the cutting line CL is located outside the core portion-forming region 130X for comparison. Hereinafter, problems that occur with this arrangement will be described.

As shown in FIG. 6, the workpiece 100X is basically the same as the workpiece 100, except that a part of the dummy core portions 16 (dummy core portions 16 positioned on the minus side of the Y-axis) is omitted. As a result of the dummy core portions 16 being omitted, the core portion-forming region 130X for comparison is smaller than the core portion-forming region 130, and the cutting line CL protrudes outward beyond the core portion-forming region 130X for comparison.

Figures 7A, 7B:
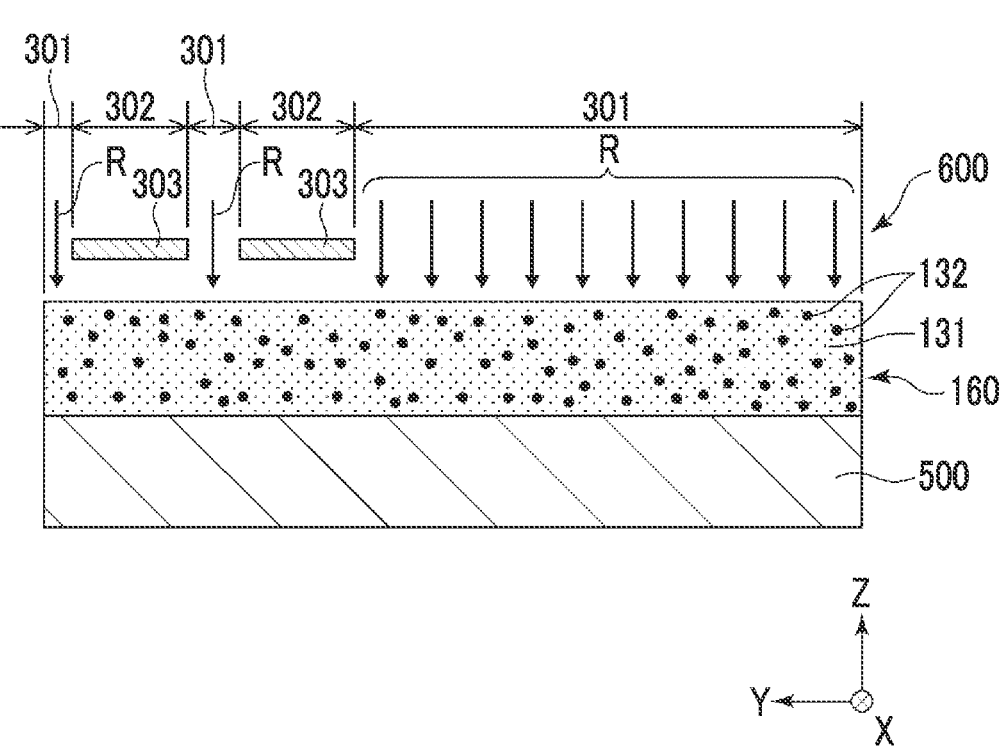
FIGS. 7A and 7B are cross-sectional views for explaining the manufacturing method of an optical waveguide according to the comparative example.

In the manufacturing method of an optical waveguide according to the comparative example, first, as shown in FIG. 7A, a core film 600 which is a laminate of a substrate 500 and a core forming layer 160 is prepared.

Examples of a method of forming the core forming layer 160 include a method of applying a varnish-like resin composition for forming core onto the substrate 500 and then drying the resin composition, and a method of laminating a resin film on the substrate 500.

Examples of the resin composition for forming core include a composition containing a polymer, a monomer, a polymerization initiator, and the like.

Examples of the monomer include a photopolymerizable monomer which reacts in an irradiated region by irradiation with active radiation such as visible light, ultraviolet light, infrared light, laser light, electron beam, and X-rays to produce a reactant. In addition, the monomer is movable in an in-plane direction orthogonal to a film thickness in the core forming layer 160 during the irradiation with active radiation, and as a result, a difference in refractive index may be generated between an irradiated region and a non-irradiated region in a core layer 13X shown in FIG. 6.

Next, as shown in FIG. 7B, a part of the core forming layer 160 is irradiated with an active radiation R through a photomask 303. FIG. 7B shows a polymer 131 and a monomer 132 contained in the core forming layer 160. The monomer 132 or a structure derived from the monomer 132 has a lower refractive index than the polymer 131.

Figure 8D:
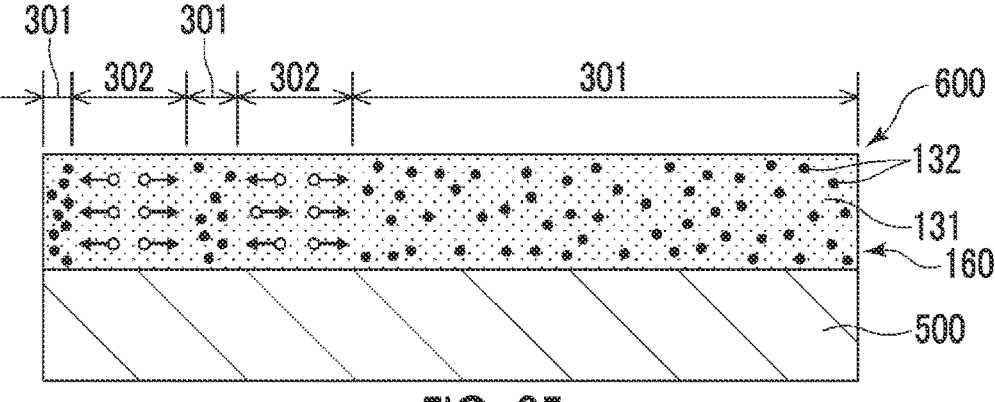
FIGS. 8D to 8F are cross-sectional views for explaining the manufacturing method of an optical waveguide according to the comparative example.

After the core forming layer 160 is irradiated with the active radiation R, the core forming layer 160 is heated. By this heating, the polymerization initiator present in an irradiated region 301 is activated to proceed a reaction of the monomer 132. Therefore, a difference in concentration of the monomer 132 occurs, and the monomer 132 moves accordingly. As a result, as shown in FIG. 8D, a concentration of the monomer 132 in the irradiated region 301 increases, and a concentration of the monomer 132 in a non-irradiated region 302 decreases. Accordingly, a refractive index of the irradiated region 301 is lowered under the influence of the monomer 132, and a refractive index of the non-irradiated region 302 is increased under the influence of the polymer 131. As a result, as shown in FIG. 8E, the core layer 13 including the waveguide core portion 14, the dummy core portion 16, the first side cladding portion 15, and the second side cladding portion 17 is obtained.

Figure 8E:
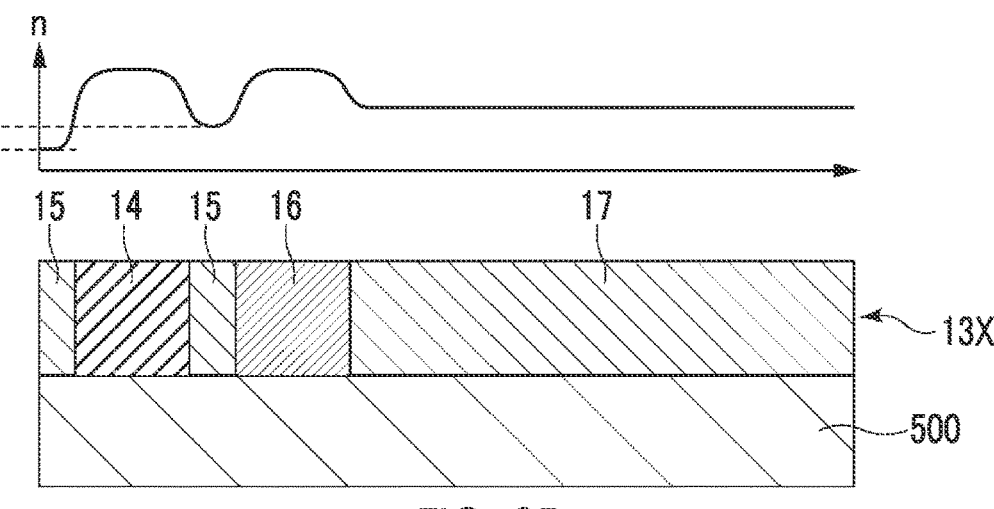

FIG. 8E shows a distribution of a refractive index n in the Y-axis direction by a graph. The distribution of the refractive index n is caused by the difference in concentration of the monomer 132 or the structure derived therefrom. In the distribution of the refractive index n shown in FIG. 8E, the refractive index n of the side cladding portion increases toward the Y-axis minus side. As a result, the difference in refractive index between the core portion and the side cladding portion decreases toward the Y-axis minus side. Hereinafter, such a decrease of the difference in refractive index along the Y-axis is referred to as "gradual decrease of the difference in refractive index".

Figure 8F:
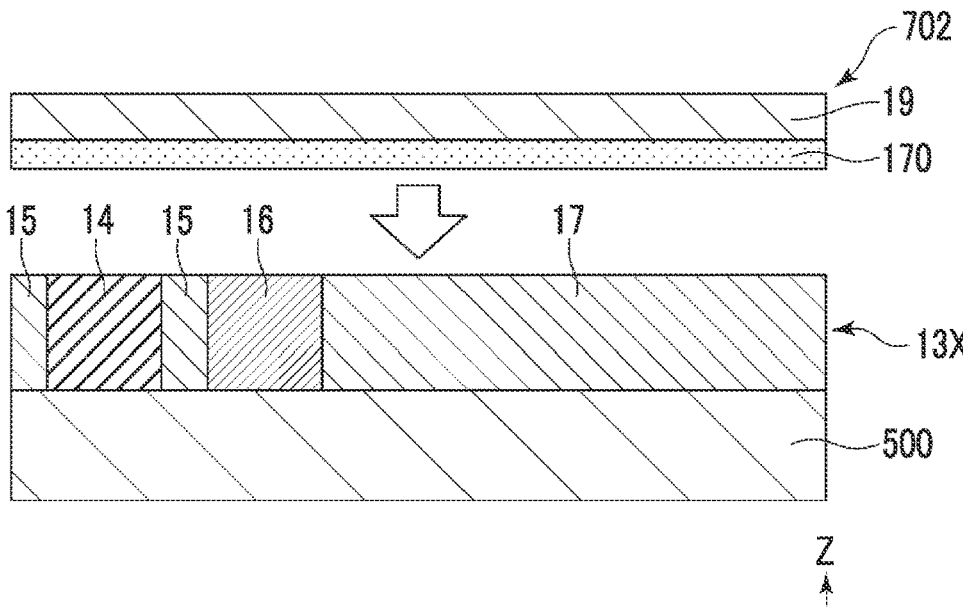

Next, as shown in FIG. 8F, a cladding film 702, which is a laminate of a clad forming layer 170 and the second cover layer 19, is laminated on the core layer 13. Thereafter, the obtained member is heated. As a result, the core layer 13 and the cladding film 702 are bonded to each other, and the second cladding layer 12 covering the core layer 13 is obtained as shown in FIG. 9G.

Next, as shown in FIG. 9H, the substrate 500 is peeled off from the core layer 13.

Figure 10J:
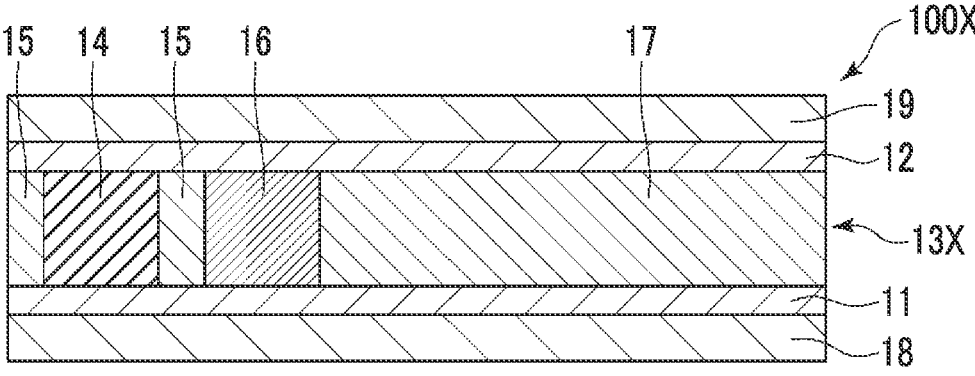
FIGS. 10J to 10L are cross-sectional views for explaining the manufacturing method of an optical waveguide according to the comparative example.

Next, as shown in FIG. 9I, a cladding film 701, which is a laminate of the clad forming layer 170 and the first cover layer 18, is laminated on the core layer 13. Thereafter, the obtained member is heated. As a result, the core layer 13 and the cladding film 701 are bonded to each other, and the first cladding layer 11 covering the core layer 13 is obtained as shown in FIG. 10J. In the manner described above, the workpiece 100X shown in FIG. 10J is obtained.

Figure 10K:
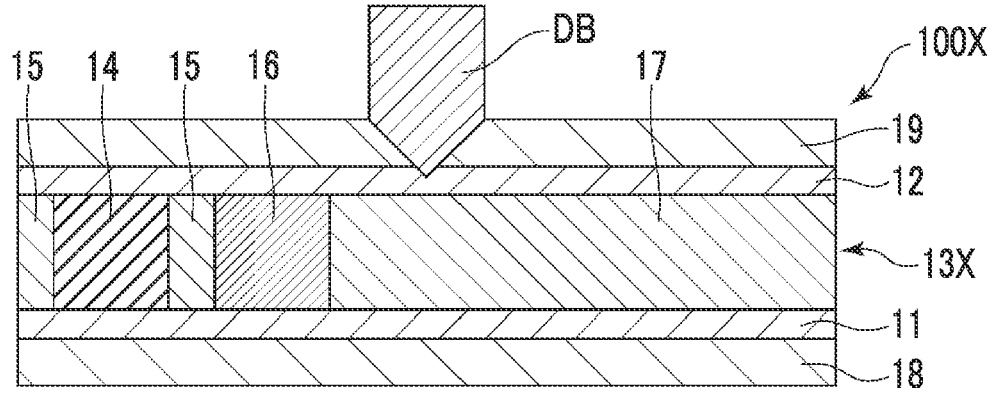

Next, as shown in FIG. 10K, the workpiece 100X is cut along the cutting line CL shown in FIG. 6 by a dicing blade DB. As a result, as shown in FIG. 10L, an optical waveguide 1X is cut out.

Figure 10L:
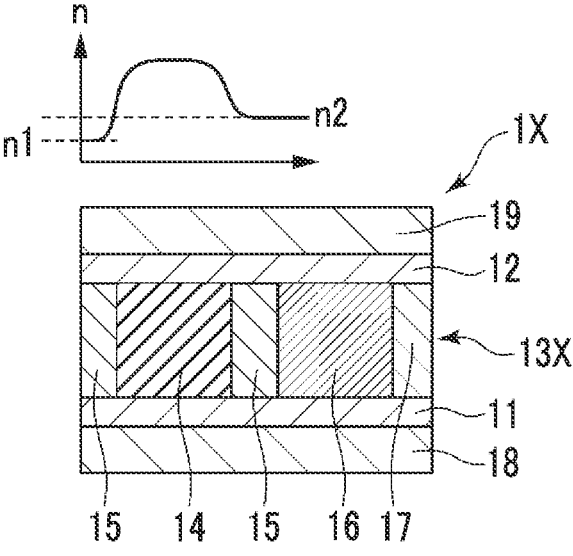
Figure 10L:
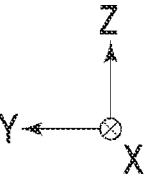

FIG. 10L shows a refractive index distribution of the optical waveguide 1X in the Y-axis direction by a graph.

In the manufacturing method of an optical waveguide according to the comparative example, as described above, a part of the cutting line CL is located outside the core portion-forming region 130X for comparison. A portion of the cut-out optical waveguide 1X located outside the core portion-forming region 130X for comparison is affected by the above-described gradual decrease of the difference in refractive index. That is, in the optical waveguide 1X, a refractive index n2 of the side cladding portion located on the Y-axis minus side of the waveguide core portion 14 is higher than a refractive index n1 of the side cladding portion located on the Y-axis plus side. As a result, a deviation of the difference in refractive index is large on both sides in the Y-axis direction through the waveguide core portion 14. Such a deviation of the difference in refractive index causes an increase in transmission loss of the waveguide core portion 14. As a result, the transmission loss between the channels varies in the plurality of the waveguide core portions 14 included in the optical waveguide 1X, that is, in the plurality of channels.

According to the manufacturing method of an optical waveguide according to the present embodiment, which will be described below, the above-described problems can be solved.

3. Manufacturing Method of Optical Waveguide

Next, the manufacturing method of an optical waveguide according to the embodiment will be described.

Figure 11:
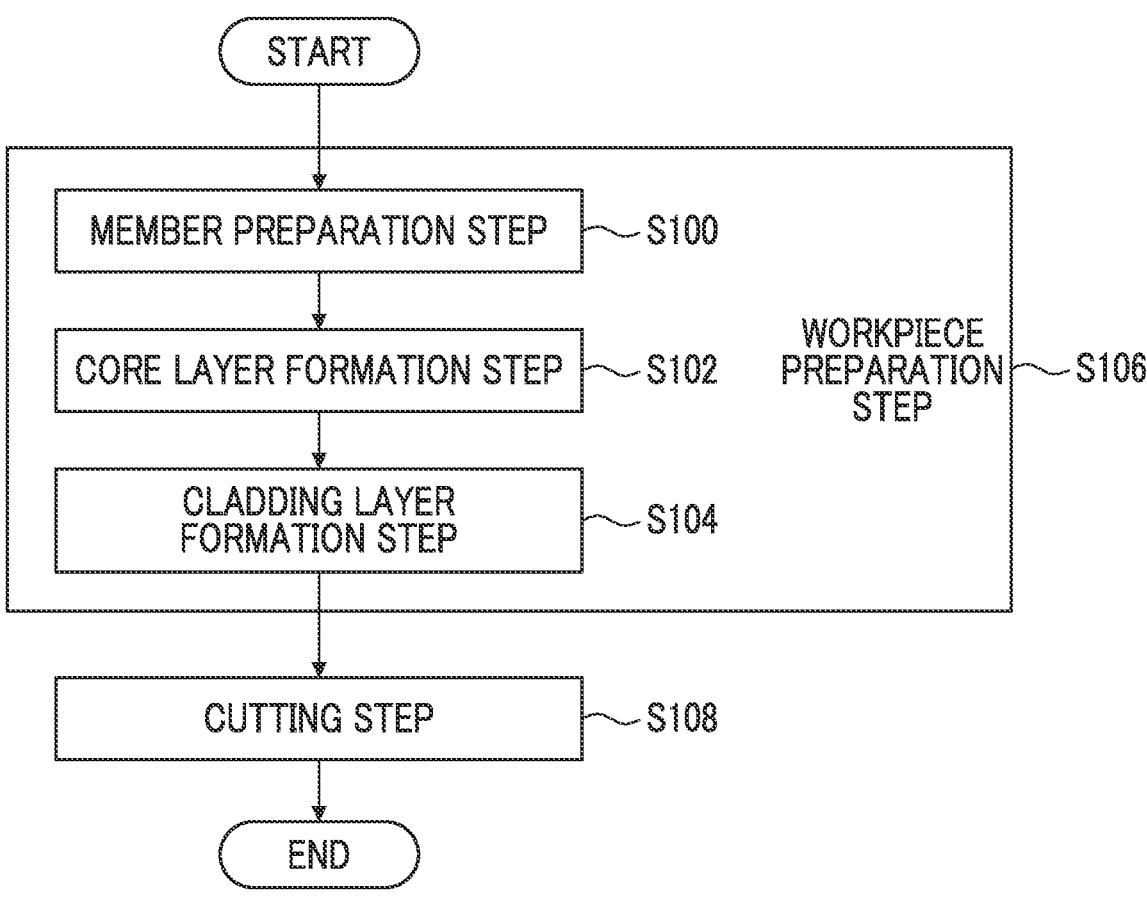
FIG. 11 is a process diagram for explaining the manufacturing method of an optical waveguide according to the embodiment.

FIG. 11 is a process diagram for explaining the manufacturing method of an optical waveguide according to the embodiment. FIGS. 12 to 15 are cross-sectional views for explaining the manufacturing method of an optical waveguide according to the embodiment. FIGS. 12 to 15 correspond to enlarged views of a part C of FIG. 3.

The manufacturing method of an optical waveguide shown in FIG. 11 includes a workpiece preparation step S106 and a cutting step S108.

In the workpiece preparation step S106, the workpiece 100 which includes the core layer 13 including the core portion-forming region 130 and has a sheet shape is prepared. In the cutting step S108, the optical waveguide 1 is cut out from the inside of the core portion-forming region 130 in the workpiece 100. Therefore, the cutting line CL shown in FIG. 2 is located inside the core portion-forming region 130.

Hereinafter, each step will be sequentially described.

3.1. Workpiece Preparation Step

As shown in FIG. 11, the workpiece preparation step S106 includes a member preparation step S100, a core layer formation step S102, and a cladding layer formation step S104.

3.1.1. Member Preparation Step

Figure 12A:
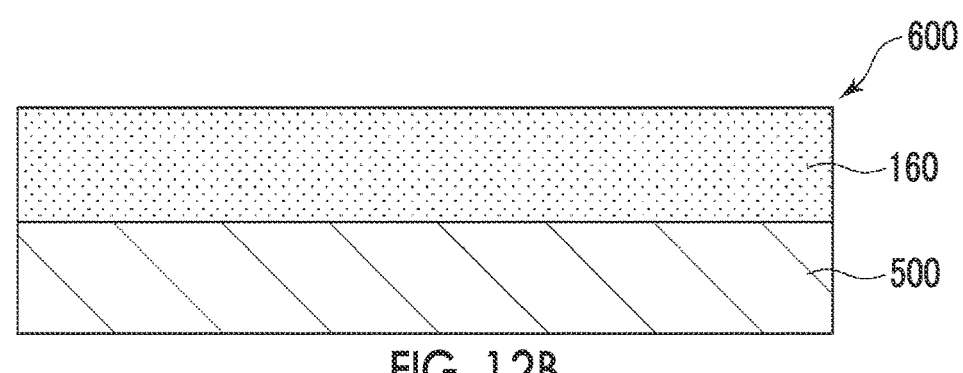
FIGS. 12A to 12C are cross-sectional views for explaining the manufacturing method of an optical waveguide according to the embodiment.
Figure 13D:
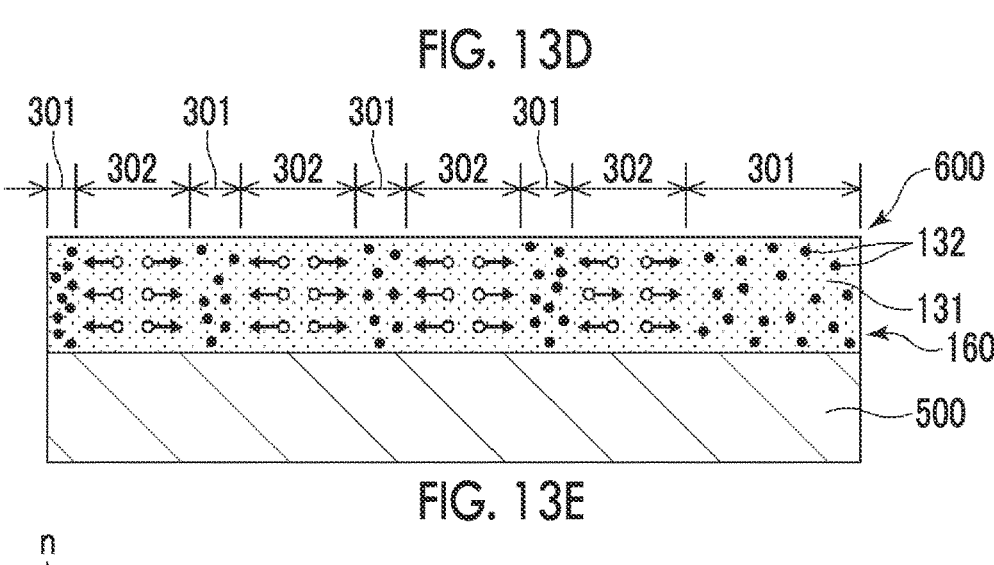
FIGS. 13D to 13F are cross-sectional views for explaining the manufacturing method of an optical waveguide according to the embodiment.
Figure 13E:
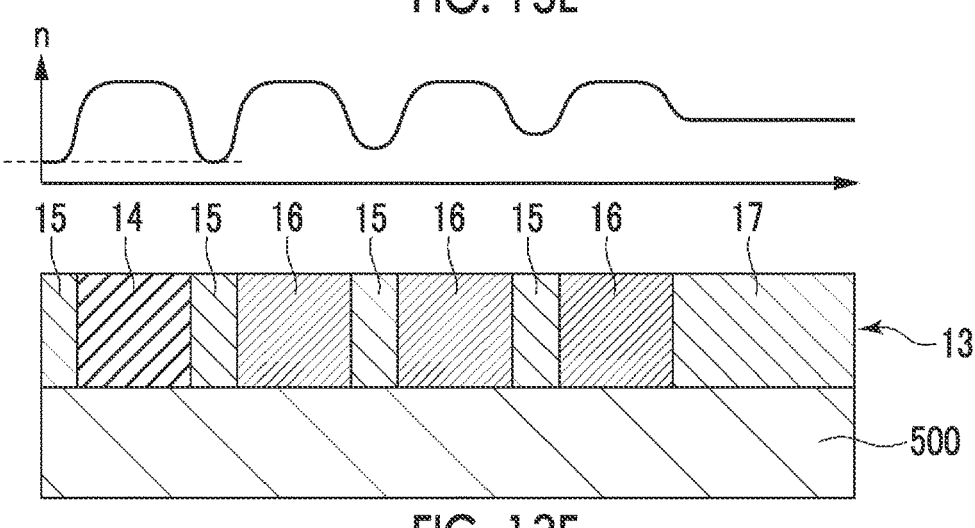
Figure 13F:
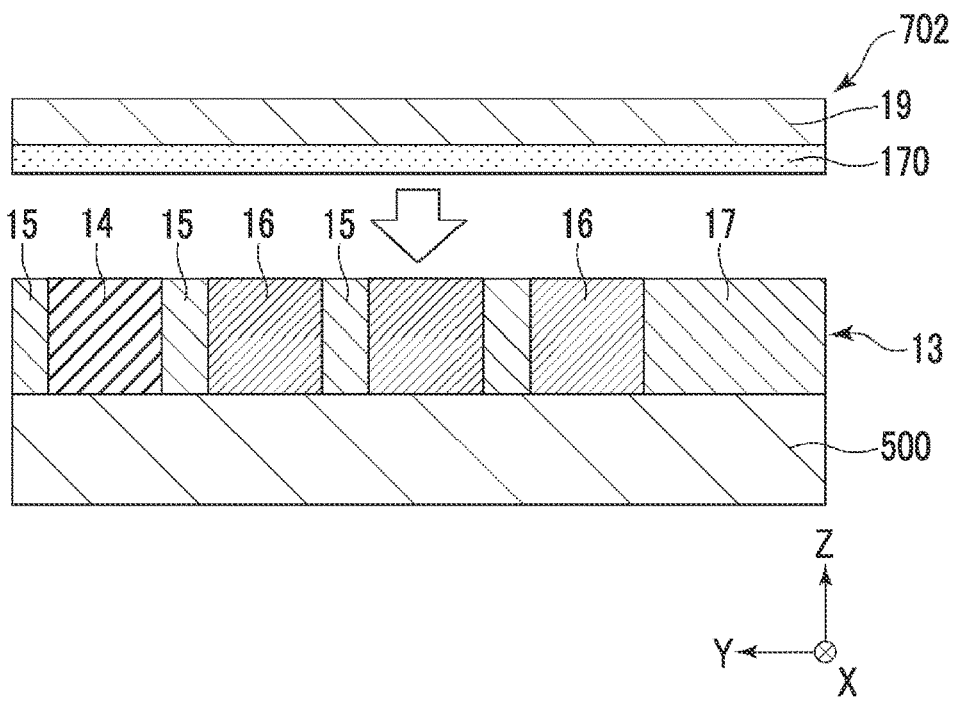
Figure 14G:
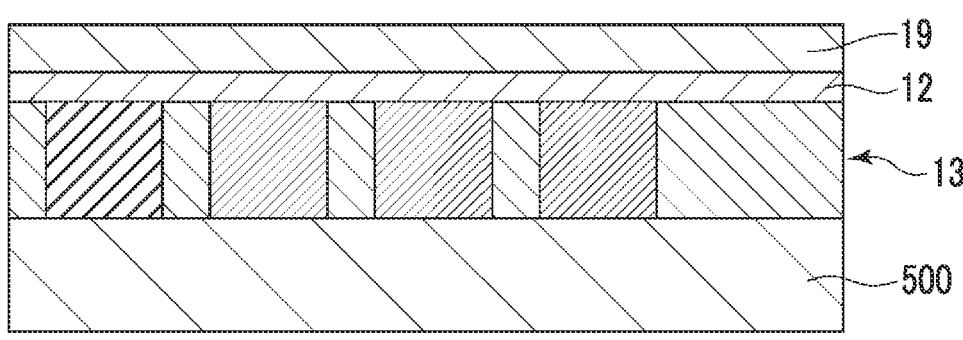
FIGS. 14G to 14I are cross-sectional views for explaining the manufacturing method of an optical waveguide according to the embodiment.

In the member preparation step S100, the core film 600 shown in FIG. 12A is prepared. In addition, in the member preparation step S100, the cladding film 702 shown in FIG. 13F and the cladding film 701 shown in FIG. 14I are prepared. Hereinafter, these members will be sequentially described.

3.1.1.1. Core Film

As shown in FIG. 12A, the core film 600 is a laminate of the substrate 500 and the core forming layer 160. The core film 600 has a film shape, and may be in a sheet shape or a roll shape which can be wound.

Examples of a method of forming the core forming layer 160 include a method of applying a varnish-like resin composition for forming core onto the substrate 500 and then drying the resin composition, and a method of laminating a resin film on the substrate 500.

In the method of applying the resin composition, for example, a method of applying the resin composition using various coaters such as a spin coater, a die coater, a comma coater, and a curtain coater, a printing method such as screen printing, and the like are used.

In the method of laminating the resin film, a method of laminating a film-like resin film produced from a varnish-like resin composition for forming core using, for example, roll lamination, vacuum roll lamination, flat plate lamination, vacuum flat plate lamination, normal pressure press, vacuum press, or the like is used.

3.1.1.1.1. Substrate

For the substrate 500, for example, a resin film is used. Examples of a constituent material of the substrate 500 include polyolefins such as polyethylene terephthalate (PET), polyethylene naphthalate (PEN), polyethylene, and polypropylene, polyimide, polyamide, polyetherimide, polyamideimide, fluororesins such as polytetrafluoroethylene (PTFE), polycarbonate, polyethersulfone, polyphenylene sulfide, and liquid crystal polymers.

The substrate 500 may be subjected to a release treatment or the like to facilitate peeling of the core layer 13 and the substrate 500, as necessary.

3.1.1.1.2. Resin Composition for Forming Core

Examples of the above-described resin composition for forming core include a composition containing a polymer, a monomer, a polymerization initiator, and the like.

3.1.1.1.2.1. Polymer

Examples of the polymer include cyclic ether resins such as an acrylic resin, a methacrylic resin, polycarbonate, polystyrene, an epoxy-based resin, and an oxetane resin, polyamide, polyimide, polybenzoxazole, polysilane, polysilazane, a silicone-based resin, a fluorine-based resin, polyurethane, a polyolefin-based resin, polybutadiene, polyisoprene, polychloroprene, polyesters such as PET and PBT, polyethylene succinate, polysulfone, polyether, cyclic olefin-based resins such as a benzocyclobutene-based resin and a norbornene-based resin, and a phenoxy resin; and one or a combination of two or more of these resins may be used as a polymer alloy, a polymer blend (mixture), a copolymer, or the like.

Among these, as the polymer, an acrylic resin, a phenoxy resin, or a cyclic olefin-based resin is preferably used.

Examples of the acrylic resin include a polymer of an acrylic compound including one or more selected from the group consisting of a monofunctional acrylate, a polyfunctional acrylate, a monofunctional methacrylate, a polyfunctional methacrylate, a urethane acrylate, a urethane methacrylate, an epoxy acrylate, an epoxy methacrylate, a polyester acrylate, and a urea acrylate. In addition, the acrylic resin may have a polyester skeleton, a polypropylene glycol skeleton, a bisphenol skeleton, a fluorene skeleton, a tricyclodecane skeleton, a biscyclopentadiene skeleton, or the like.

Examples of the phenoxy resin include a polymer including, as a constitutional unit of a copolymer component, bisphenol A, a bisphenol A-type epoxy compound or a derivative thereof, bisphenol F, or a bisphenol F-type epoxy compound or a derivative thereof.

A content of the polymer is, for example, preferably 15% by mass or more, more preferably 40% by mass or more, and still more preferably 60% by mass or more of the total solid content of the resin composition for forming core. As a result, mechanical characteristics of the core layer 13 are improved. In addition, the content of the polymer contained in the resin composition for forming core is preferably 95% by mass or less and more preferably 90% by mass or less of the total solid content of the resin composition for forming core. As a result, optical characteristics of the core layer 13 are improved.

The total solid content of the resin composition for forming core refers to non-volatile contents in the composition, and refers to a residue obtained by removing volatile components such as water and a solvent.

3.1.1.1.2.2. Monomer

The monomer may be any compound having a polymerizable moiety in the molecular structure and is not particularly limited, and examples thereof include an acrylic acid (methacrylic acid)-based monomer, an epoxy-based monomer, an oxetane-based monomer, a norbornene-based monomer, a vinyl ether-based monomer, a styrene-based monomer, and a photodimerizable monomer; and one or two or more of these monomers are used in combination.

Among these, as the monomer, an acrylic acid (methacrylic acid)-based monomer or an epoxy-based monomer is preferably used.

Examples of the acrylic acid (methacrylic acid)-based monomer include a compound having two or more ethylenically unsaturated groups, and a difunctional or tri- or higher functional (meth)acrylate. Specific examples thereof include aliphatic (meth)acrylates, alicyclic (meth)acrylates, aromatic (meth)acrylates, heterocyclic (meth)acrylates, or ethoxylated, propoxylated, ethoxylated and propoxylated, or caprolactone-modified products thereof. In addition, the monomer may have a bisphenol skeleton, a urethane skeleton, or the like in the molecule.

Examples of the epoxy-based monomer include an alicyclic epoxy compound, an aromatic epoxy compound, and an aliphatic epoxy compound.

As the monomer, a photopolymerizable monomer, which reacts in an irradiated region by irradiation with active radiation such as visible light, ultraviolet light, infrared light, laser light, electron beam, and X-rays to produce a reactant, may be used. In addition, the monomer is movable in an in-plane direction orthogonal to a film thickness in the core forming layer 160 during the irradiation with active radiation, and as a result, a difference in refractive index may be generated between an irradiated region and a non-irradiated region in the core layer 13.

A content of the monomer is preferably 1 part by mass or more and 70 parts by mass or less and more preferably 10 parts by mass or more and 60 parts by mass or less with respect to 100 parts by mass of the polymer. As a result, the above-described formation of the difference in refractive index, that is, the refractive index modulation can occur more reliably.

3.1.1.1.2.3. Polymerization Initiator

The polymerization initiator is appropriately selected depending on the type of polymerization reaction or cross-linking reaction of the monomer. As the polymerization initiator, for example, a radical polymerization initiator such as an acrylic acid (methacrylic acid)-based monomer and a styrene-based monomer, or a cationic polymerization initiator such as an epoxy-based monomer, an oxetane-based monomer, and a vinyl ether-based monomer can be used.

Examples of the radical polymerization initiator include benzophenones and acetophenones. Specific examples thereof include Irgacure (registered trademark) 651, Irgacure 819, Irgacure 2959, and Irgacure 184 (all manufactured by IGM Japan, Inc.).

Examples of the cationic polymerization initiator include a Lewis acid-generating compound such as a diazonium salt, and a Brønsted acid-generating compound such as an iodonium salt and a sulfonium salt. Specific examples thereof include Adeka Optomer SP-170 (manufactured by Adeka Corporation), Sanaid SI-100L (manufactured by Sanshin Chemical Industry Co., Ltd.), and Rhodorsil 2074 (manufactured by Rhodia Japan Inc.).

A content of the polymerization initiator is preferably 0.01 parts by mass or more and 5 parts by mass or less and more preferably 0.05 parts by mass or more and 3 parts by mass or less with respect to 100 parts by mass of the polymer. As a result, the monomer can be rapidly reacted without deteriorating the optical characteristics and mechanical characteristics of the core layer 13.

3.1.1.1.2.4. Others

The resin composition for forming core may further contain, for example, a cross-linking agent, a sensitizer (a photosensitizer), a catalyst precursor, a co-catalyst, an anti-oxidant, an ultraviolet absorber, a light stabilizer, a silane coupling agent, a coating surface improver, a thermal polymerization inhibitor, a leveling agent, a surfactant, a colorant, a preservative stabilizer, a plasticizer, a lubricant, a filler, inorganic particles, an anti-deterioration agent, a wetting property improver, an antistatic agent, and the like.

3.1.1.1.2.5. Solvent

By adding the above-described components to a solvent and stirring, the varnish-like resin composition for forming core is obtained. The obtained composition may be subjected to a filtration treatment using, for example, a PTFE filter having a pore size of 0.2 µm. In addition, the obtained composition may be subjected to a mixing treatment with various mixers.

Examples of the solvent contained in the resin composition for forming core include organic solvents such as acetone, methyl ethyl ketone, methyl isobutyl ketone, toluene, ethyl acetate, cyclohexane, heptane, methylcyclohexane, cyclohexanone, tetrahydrofuran, dimethylformamide, dimethylacetamide, dimethylsulfoxide, ethylene glycol, ethylene glycol monomethyl ether, ethylene glycol monoethyl ether, propylene glycol monomethyl ether, propylene glycol monoethyl ether, diethylene glycol dimethyl ether, ethylene glycol monomethyl ether acetate, propylene glycol monomethyl ether acetate, cellosolves, carbitols, anisole, and N-methylpyrrolidone; and one kind or a mixture of two or more kinds thereof is used.

3.1.1.2. Cladding Film

As shown in FIG. 14I, the cladding film 701 is a laminate of the first cover layer 18 and the clad forming layer 170. As shown in FIG. 13F, the cladding film 702 is a laminate of the second cover layer 19 and the clad forming layer 170. The cladding films 701 and 702 have a film shape, and may be in a sheet shape or a roll shape which can be wound.

Examples of the method of forming the clad forming layer 170 include a method of applying a varnish-like resin composition for forming clad onto the cover layer and then drying the resin composition, and a method of laminating a resin film on the cover layer.

In the method of applying the resin composition, for example, a method of applying the resin composition using various coaters such as a spin coater, a die coater, a comma coater, and a curtain coater, a printing method such as screen printing, and the like are used.

In the method of laminating the resin film, a method of laminating a film-like resin film produced from the varnish-like resin composition for forming clad using, for example, roll lamination, vacuum roll lamination, flat plate lamination, vacuum flat plate lamination, normal pressure press, vacuum press, or the like is used.

3.1.1.2.1. Cover Layer

Film thicknesses of the first cover layer 18 and the second cover layer 19 are not particularly limited, but are preferably approximately 1 to 200 µm, more preferably approximately 3 to 100 µm, and still more preferably approximately 5 to 50 µm. In a case where the film thickness of each of the cover layers is within the above-described range, it is possible to suppress an adverse effect of the workpiece 100 by being too thick, for example, the flexibility of the optical waveguide 1 to be manufactured is reduced, while ensuring the ability to protect the core layer 13 and the like by the first cover layer 18 and the second cover layer 19.

The film thicknesses of the first cover layer 18 and the second cover layer 19 may be different from each other, but are preferably the same as each other. Accordingly, it is possible to suppress warpage of the optical waveguide 1 due to the difference in film thickness. The same film thickness means that the difference in film thickness is 5 µm or less.

Examples of main materials of the first cover layer 18 and the second cover layer 19 include materials including various resins, for example, polyolefins such as polyethylene terephthalate (PET), polyethylene naphthalate (PEN), polyethylene, and polypropylene, polyimide, polyamide, polyetherimide, polyamideimide, fluororesins such as polytetrafluoroethylene (PTFE), polycarbonate, polyethersulfone, polyphenylene sulfide, and liquid crystal polymers.

The main materials of the first cover layer 18 and the second cover layer 19 may be different from each other, but are preferably the same as each other. Accordingly, it is possible to suppress warpage of the optical waveguide 1 due to the difference in main material.

An elastic modulus of the first cover layer 18 and the second cover layer 19 is preferably 1 to 12 GPa, more preferably 2 to 11 GPa, and still more preferably 3 to 10 GPa. The above-described elastic modulus is a tensile elastic modulus.

3.1.1.2.2. Resin Composition for Forming Clad

Examples of the resin composition for clad include a composition containing a polymer, a monomer, a polymerization initiator, and the like.

3.1.1.2.2.1. Polymer

Examples of the polymer include cyclic ether resins such as an acrylic resin, a methacrylic resin, polycarbonate, polystyrene, an epoxy-based resin, and an oxetane resin, polyamide, polyimide, polybenzoxazole, polysilane, polysilazane, a silicone-based resin, a fluorine-based resin, polyurethane, a polyolefin-based resin, polybutadiene, polyisoprene, polychloroprene, polyesters such as PET and PBT, polyethylene succinate, polysulfone, polyether, cyclic olefin-based resins such as a benzocyclobutene-based resin and a norbornene-based resin, and a phenoxy resin; and one or a combination of two or more of these resins may be used as a polymer alloy, a polymer blend (mixture), a copolymer, or the like.

Among these, as the polymer, an acrylic resin, a phenoxy resin, or a cyclic olefin-based resin is preferably used.

Examples of the acrylic resin include a polymer of an acrylic compound including one or more selected from the group consisting of a monofunctional acrylate, a polyfunctional acrylate, a monofunctional methacrylate, a polyfunctional methacrylate, a urethane acrylate, a urethane methacrylate, an epoxy acrylate, an epoxy methacrylate, a polyester acrylate, and a urea acrylate. In addition, the acrylic resin may have a polyester skeleton, a polypropylene glycol skeleton, a bisphenol skeleton, a fluorene skeleton, a tricyclodecane skeleton, a biscyclopentadiene skeleton, or the like.

Examples of the phenoxy resin include a polymer including, as a constitutional unit of a copolymer component, bisphenol A, a bisphenol A-type epoxy compound or a derivative thereof, bisphenol F, or a bisphenol F-type epoxy compound or a derivative thereof.

In addition, the polymer may contain a thermosetting resin as necessary. Examples of the thermosetting resin include an amino resin, an isocyanate compound, a block isocyanate compound, a maleimide compound, a benzoxazine compound, an oxazoline compound, a carbodiimide compound, a cyclocarbonate compound, a polyfunctional oxetane compound, an episulfide resin, and an epoxy resin.

A content of the polymer is, for example, preferably 15% by mass or more, more preferably 40% by mass or more, and still more preferably 60% by mass or more of the total solid content of the resin composition for forming clad. As a result, mechanical characteristics of the first cladding layer 11 and the second cladding layer 12 are improved. In addition, the content of the polymer contained in the resin composition for forming clad is preferably 95% by mass or less and more preferably 90% by mass or less of the total solid content of the resin composition for forming clad. As a result, optical characteristics of the first cladding layer 11 and the second cladding layer 12 are improved.

The total solid content of the resin composition for forming clad refers to non-volatile contents in the composition, and refers to a residue obtained by removing volatile components such as water and a solvent.

3.1.1.2.2.2. Monomer

The monomer may be any compound having a polymerizable moiety in the molecular structure and is not particularly limited, and examples thereof include an acrylic acid (methacrylic acid)-based monomer, an epoxy-based monomer, an oxetane-based monomer, a norbornene-based monomer, a vinyl ether-based monomer, a styrene-based monomer, and a photodimerizable monomer; and one or two or more of these monomers are used in combination.

Among these, as the monomer, an acrylic acid (methacrylic acid)-based monomer or an epoxy-based monomer is preferably used.

Examples of the acrylic acid (methacrylic acid)-based monomer include a compound having two or more ethylenically unsaturated groups, and a difunctional or tri- or higher functional (meth)acrylate. Specific examples thereof include aliphatic (meth)acrylates, alicyclic (meth)acrylates, aromatic (meth)acrylates, heterocyclic (meth)acrylates, or ethoxylated, propoxylated, ethoxylated and propoxylated, or caprolactone-modified products thereof. In addition, the monomer may have a bisphenol skeleton, a urethane skeleton, or the like in the molecule.

Examples of the epoxy-based monomer include an alicyclic epoxy compound, an aromatic epoxy compound, and an aliphatic epoxy compound.

A content of the monomer is preferably 1 part by mass or more and 70 parts by mass or less and more preferably 10 parts by mass or more and 60 parts by mass or less with respect to 100 parts by mass of the polymer.

3.1.1.2.2.3. Polymerization Initiator

The polymerization initiator is appropriately selected depending on the type of polymerization reaction or cross-linking reaction of the monomer. As the polymerization initiator, for example, a radical polymerization initiator such as an acrylic acid (methacrylic acid)-based monomer and a styrene-based monomer, or a cationic polymerization initiator such as an epoxy-based monomer, an oxetane-based monomer, and a vinyl ether-based monomer can be used.

Examples of the radical polymerization initiator include benzophenones and acetophenones. Specific examples thereof include Irgacure 651, Irgacure 819, Irgacure 2959, and Irgacure 184 (all manufactured by IGM Japan, Inc.).

Examples of the cationic polymerization initiator include a Lewis acid-generating compound such as a diazonium salt, and a Brønsted acid-generating compound such as an iodonium salt and a sulfonium salt. Specific examples thereof include Adeka Optomer SP-170 (manufactured by Adeka Corporation), Sanaid SI-100L (manufactured by Sanshin Chemical Industry Co., Ltd.), and Rhodorsil 2074 (manufactured by Rhodia Japan Inc.).

A content of the polymerization initiator is preferably 0.01 parts by mass or more and 5 parts by mass or less and more preferably 0.05 parts by mass or more and 3 parts by mass or less with respect to 100 parts by mass of the polymer. As a result, the monomer can be rapidly reacted without deteriorating the optical characteristics and mechanical characteristics of the first cladding layer 11 and the second cladding layer 12.

3.1.1.2.2.4. Others

The resin composition for forming clad may further contain, for example, a cross-linking agent, a sensitizer (a photosensitizer), a catalyst precursor, a co-catalyst, an antioxidant, an ultraviolet absorber, a light stabilizer, a silane coupling agent, a coating surface improver, a thermal polymerization inhibitor, a leveling agent, a surfactant, a colorant, a preservative stabilizer, a plasticizer, a lubricant, a filler, inorganic particles, an anti-deterioration agent, a wetting property improver, an antistatic agent, and the like.

3.1.1.2.2.5. Solvent

By adding the above-described components to a solvent and stirring, the varnish-like resin composition for forming clad is obtained. The obtained composition may be subjected to a filtration treatment using, for example, a PTFE filter having a pore size of 0.2 μm. In addition, the obtained composition may be subjected to a mixing treatment with various mixers.

Examples of the solvent contained in the resin composition for forming clad include organic solvents such as acetone, methyl ethyl ketone, methyl isobutyl ketone, toluene, ethyl acetate, cyclohexane, heptane, methylcyclohexane, cyclohexanone, tetrahydrofuran, dimethylformamide, dimethylacetamide, dimethylsulfoxide, ethylene glycol, ethylene glycol monomethyl ether, ethylene glycol monoethyl ether, propylene glycol monomethyl ether, propylene glycol monoethyl ether, diethylene glycol dimethyl ether, ethylene glycol monomethyl ether acetate, propylene glycol monomethyl ether acetate, cellosolves, carbitols, anisole, and N-methylpyrrolidone; and one kind or a mixture of two or more kinds thereof is used.

The resin composition for forming clad, for forming the first cladding layer 11, and the resin composition for forming clad, for forming the second cladding layer 12, may be the same as each other or may be different from each other.

3.1.2. Core Layer Formation Step

In the core layer formation step S102, the core layer 13 is formed from the core forming layer 160. Specifically, a part of the core forming layer 160 is irradiated with the active radiation R to obtain the core layer 13 including the waveguide core portion 14 and the dummy core portion 16 corresponding to the non-irradiated region 302, and the first side cladding portion 15 and the second side cladding portion 17 corresponding to the irradiated region 301.

Figure 12B:
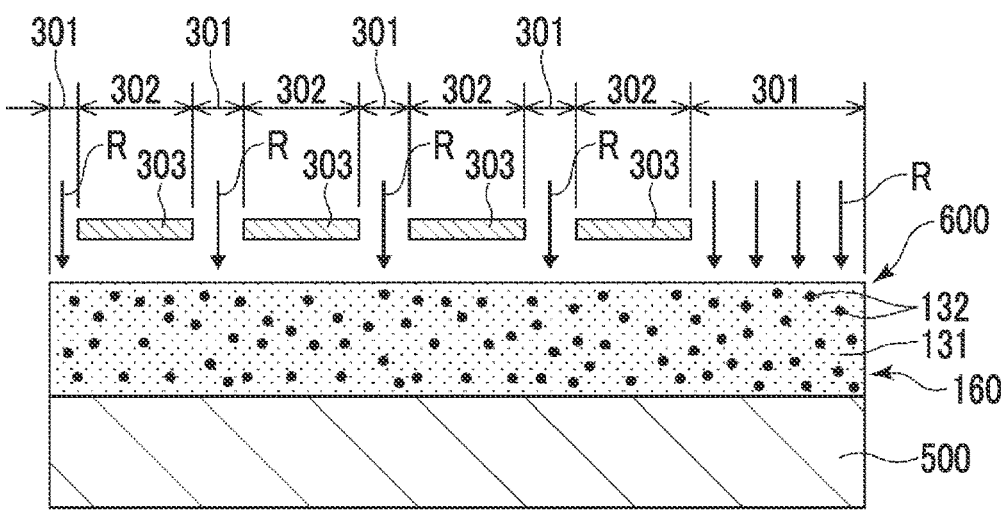

For example, a method using the photomask 303 shown in FIG. 12B is used for setting the irradiated region 301 and the non-irradiated region 302. By the irradiation with the active radiation R through the photomask 303, the irradiated region 301 and the non-irradiated region 302 can be set in correspondence with a mask pattern of the photomask 303.

Figure 12C:
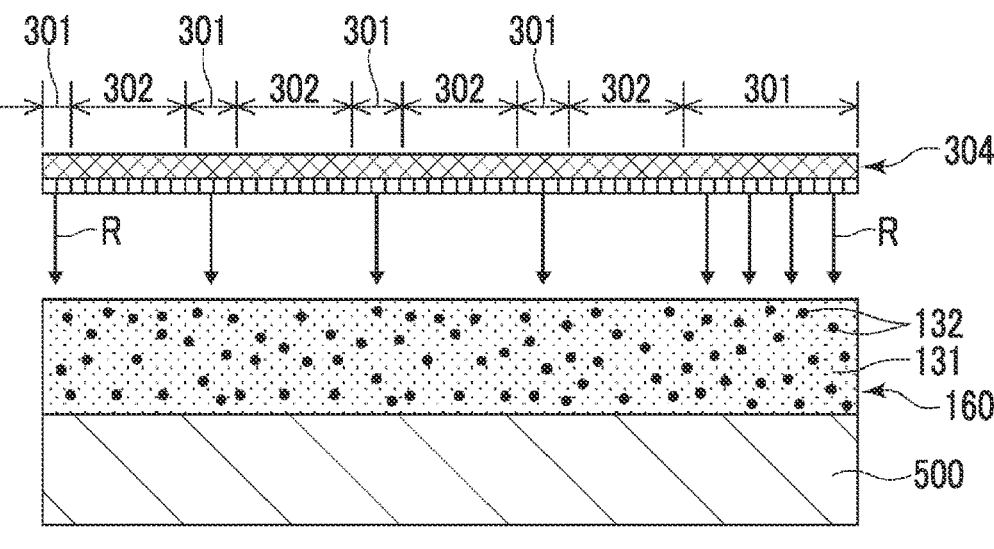
Figure 12C:
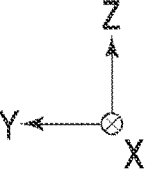

Instead of the method using the photomask 303, a method using a direct drawing exposure machine 304 may be adopted. In FIG. 12C, the active radiation R is radiated by the direct drawing exposure machine 304. Examples of the direct drawing exposure machine 304 include an exposure machine capable of selecting an irradiated region by using various spatial light modulation elements of a reflective spatial light modulation element such as a digital micromirror device (DMD) and a transmissive spatial light modulation element such as a liquid crystal display element (LCD). By using such a direct drawing exposure machine 304, it is possible to set the irradiated region 301 and the non-irradiated region 302 without using the photomask 303. As a result, it is possible to adjust the sizes of the irradiated region 301 and the non-irradiated region 302 without remaking the photomask 303, and thus it is possible to reduce and make efficient manufacturing cost of the optical waveguide 1.

FIGS. 12B and 12C show the polymer 131 and the monomer 132 contained in the core forming layer 160. In the core forming layer 160 before being irradiated with the active radiation R, the monomer 132 is substantially uniformly distributed in the polymer 131. The monomer 132 or the structure derived from the monomer 132 has a lower refractive index than the polymer 131.

After the core forming layer 160 is irradiated with the active radiation R, the core forming layer 160 is heated. By this heating, the polymerization initiator present in an irradiated region 301 is activated to proceed a reaction of the monomer 132. Therefore, a difference in concentration of the monomer 132 occurs, and the monomer 132 moves accordingly. As a result, as shown in FIG. 13D, a concentration of the monomer 132 in the irradiated region 301 increases, and a concentration of the monomer 132 in a non-irradiated region 302 decreases. Accordingly, a refractive index of the irradiated region 301 is lowered under the influence of the monomer 132, and a refractive index of the non-irradiated region 302 is increased under the influence of the polymer 131. As a result, as shown in FIG. 13E, the core layer 13 including the waveguide core portion 14, the dummy core portion 16, the first side cladding portion 15, and the second side cladding portion 17 is obtained.

Examples of heating conditions of the core forming layer 160 include a heating temperature of 100° C. to 200° C. and a heating time of 10 to 180 minutes.

With this heating, the refractive index may be changed by volatilization of the monomer 132 or a change in the molecular structure of the polymer 131.

3.1.3. Cladding Layer Formation Step

In the cladding layer formation step S104, the first cladding layer 11 and the second cladding layer 12 are laminated on the core layer 13, and the substrate 500 is peeled off. As a result, the workpiece 100 is obtained.

In the present embodiment, as shown in FIG. 13F, the cladding film 702 is laminated on the upper surface of the core layer 13. Thereafter, the obtained laminate is heated. Accordingly, the core layer 13 and the cladding film 702 are bonded to each other. As a result, as shown in FIG. 14G, the second cladding layer 12 covering the core layer 13 is obtained. Examples of heating conditions at this time include a heating temperature of 100° C. to 200° C. and a heating time of 10 to 180 minutes.

Figure 14H:
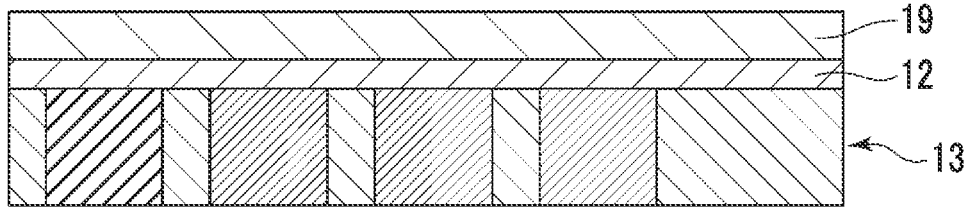
Figure 14I:
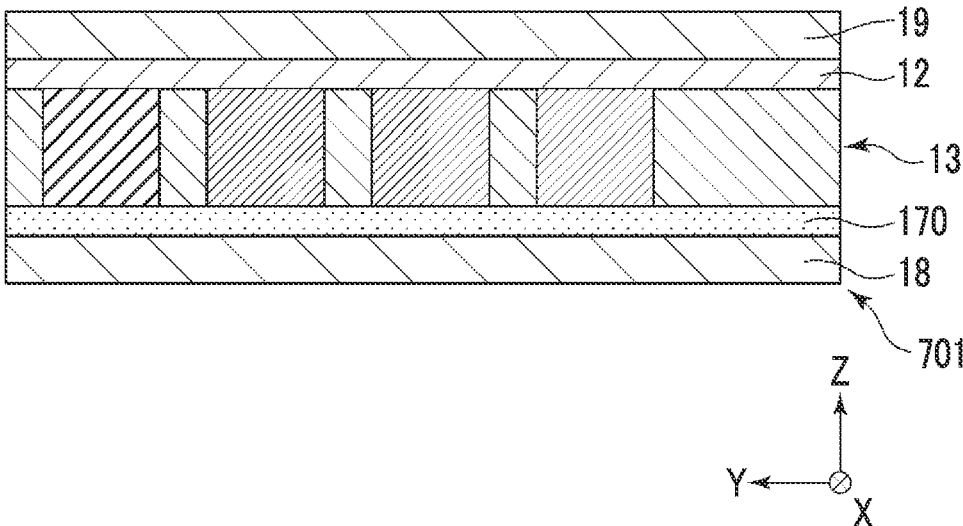
Figure 15J:
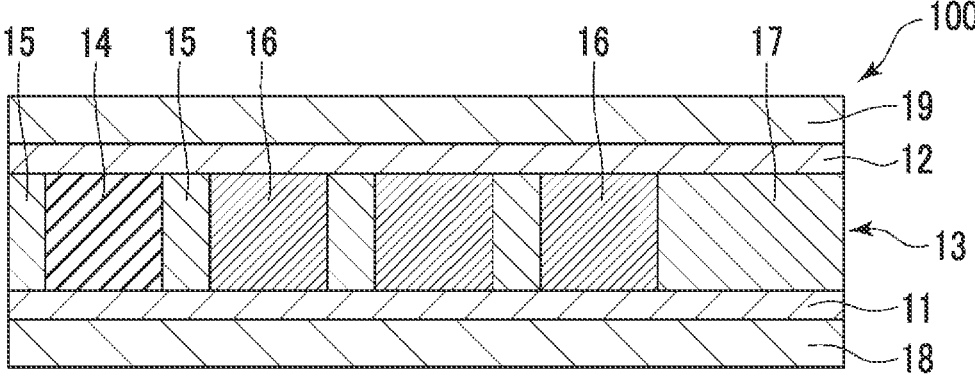
FIGS. 15J to 15L are cross-sectional views for explaining the manufacturing method of an optical waveguide according to the embodiment.

Next, as shown in FIG. 14H, the substrate 500 is peeled off from the core layer 13, and then as shown in FIG. 14I, the cladding film 701 is laminated on the lower surface of the core layer 13. Thereafter, the obtained laminate is heated. Accordingly, the core layer 13 and the cladding film 701 are bonded to each other. As a result, as shown in FIG. 15J, the first cladding layer 11 covering the core layer 13 is obtained. Examples of heating conditions at this time include a heating temperature of 100° C. to 200° C. and a heating time of 10 to 180 minutes, but it is preferable that the heating conditions are set to a higher temperature or a longer time than the heating conditions when the second cladding layer 12 is formed. In the manner described above, the workpiece 100 shown in FIG. 15J is obtained.

3.2. Cutting Step

Figure 15K:
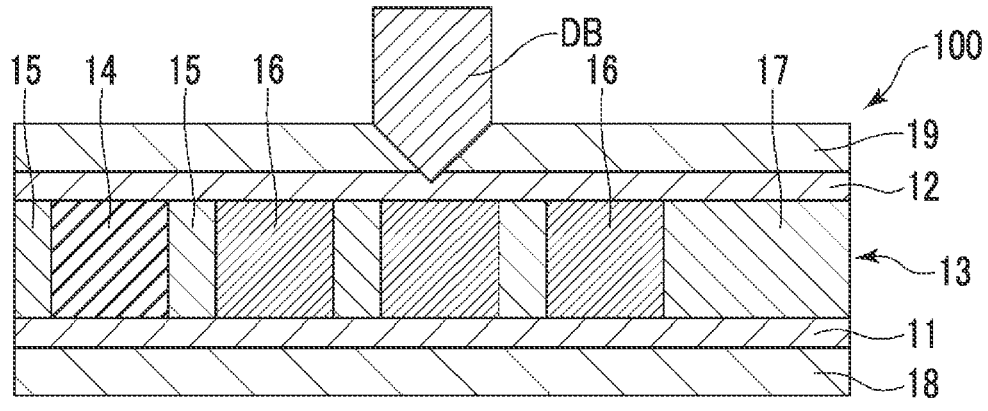

In the cutting step S108, as shown in FIG. 15K, the workpiece 100 is cut. For the cutting, for example, a dicing blade DB shown in FIG. 15K is used. Instead of cutting with the dicing blade DB, cutting with a cutting saw, a laser, a router, an ultrasonic cutter, or a water jet, or punching with a die may be used.

The workpiece 100 is cut along the cutting line CL shown in FIG. 2. As a result, as shown in FIG. 15L, the optical waveguide 1 is cut out.

Figure 15L:
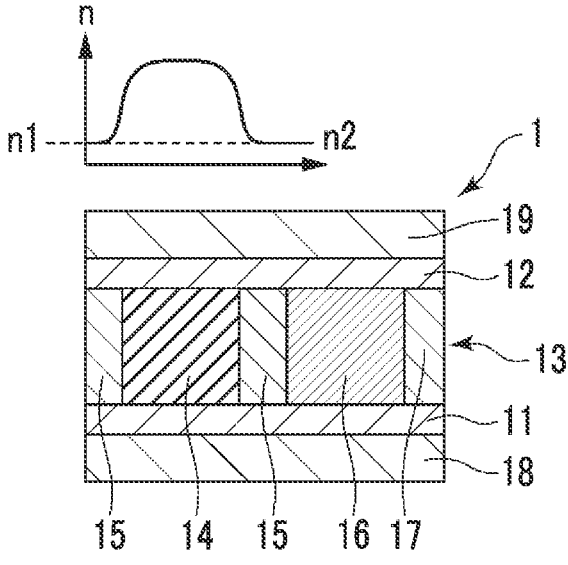
Figure 15L:
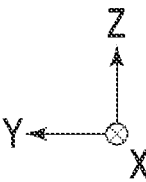

FIG. 15L shows a distribution of the refractive index n of the optical waveguide 1 in the Y-axis direction by a graph.

In the manufacturing method of an optical waveguide according to the present embodiment, as described above, the cutting line CL is positioned inside the core portion-forming region 130. Therefore, even in a case where the "gradual decrease of the difference in refractive index" occurs outside the core portion-forming region 130, the influence of the gradual decrease of the difference in refractive index is avoided in the cut-out optical waveguide 1. That is, in the optical waveguide 1, the refractive index n2 of the side cladding portion located on the Y-axis minus side of the waveguide core portion 14 is equal to the refractive index n1 of the side cladding portion located on the Y-axis plus side, or is a value close to the refractive index n1. As a result, the difference in refractive index on both sides in the Y-axis direction through the waveguide core portion 14 is reduced. Therefore, the problem that the transmission loss of the waveguide core portion 14 increases as the difference in refractive index deviates is solved. As a result, it is possible to achieve the optical waveguide 1 in which the variation in transmission loss between the channels is suppressed in the plurality of waveguide core portions 14, that is, in the plurality of channels.

In a case where the cutting line CL shown in FIG. 2 is set, the cutting line CL is preferably set from the outer edge of the core portion-forming region 130 to the inside by preferably two or more core portions and more preferably three or more core portions. As a result, the boundary line between the irradiated region 301 and the non-irradiated region 302 is disposed at a high density, so that the optical waveguide 1 in which the influence of the "gradual decrease of the difference in refractive index" is particularly suppressed can be manufactured. In FIG. 2, as an example, the cutting line CL is set from the outer edge of the core portion-forming region 130 to the inside by two or more core portions. Since the core portion-forming region 130 satisfies the requirement (b), such a setting can be reliably performed. As a result, the optical waveguide 1 in which the influence of the "gradual decrease of the difference in refractive index" is particularly suppressed can be reliably manufactured.

As described above, the manufacturing method of an optical waveguide according to the present embodiment includes the workpiece preparation step S106 and the cutting step S108. In the workpiece preparation step S106, the workpiece 100 which includes the core layer 13 including the core portion-forming region 130 and has a sheet shape is prepared. In the cutting step S108, the optical waveguide 1 is cut out from the inside of the core portion-forming region 130 in the workpiece 100.

The core layer 13 satisfies all of the following requirements (a), (b), and (c).

(a) the core layer 13 contains the polymer 131 and the monomer 132, and has a refractive index distribution based on a difference in concentration of the monomer 132 or a difference in concentration of a structure derived from the monomer 132.

(b) the core portion-forming region 130 includes a plurality of waveguide core portions 14 (first core portions), dummy core portions 16 (second core portions) provided on both sides of the waveguide core portion 14, and a first side cladding portion 15 provided between the waveguide core portion 14 and the dummy core portion 16, and the core portion-forming region 130 is defined as that a plurality of the dummy core portions 16 (second core portions) are positioned at an outer edge of the core portion-forming region 130.

(c) the core portion-forming region 130 is a region where the total area ratio occupied by the waveguide core portion 14 and the dummy core portion 16 is 50% or more in a 1 mm-square range.

According to such a configuration, since the optical waveguide 1 is cut out from the inside of the core portion-forming region 130 in the workpiece 100, the influence of the gradual decrease of the difference in refractive index described above is less likely to be exerted on the optical waveguide 1. Therefore, the optical waveguide 1 in which the difference in refractive index between the waveguide core portion 14 and the first side cladding portion 15 is sufficiently secured is obtained. As a result, the optical waveguide 1 in which the variation in transmission loss between the channels is small can be manufactured.

In addition, the core layer 13 shown in FIG. 2 includes a plurality of the core portion-forming regions 130 which are separated from each other, and a blank region 135. The blank region 135 is a region which is located between adjacent core portion-forming regions 130 and does not satisfy the (c). That is, the blank region 135 may have the waveguide core portion 14 or the dummy core portion 16, but is a region where the total area ratio thereof is less than 50%.

By including the plurality of the core portion-forming regions 130 in this way, it is possible to cut out the plurality of optical waveguides 1 from one workpiece 100.

In addition, since the blank region 135 shown in FIG. 2 is a region where the waveguide core portion 14 or the dummy core portion 16 are not provided, the blank region 135 is a region where the monomer 132 is polymerized in correspondence with the irradiated region 301 in the core layer formation step S102. Therefore, in the blank region 135 corresponding to the irradiated region 301, a volume reduction due to the decrease in monomer 132 is suppressed. On the other hand, in the core portion-forming region 130 corresponding to the non-irradiated region 302, the volume reduction due to the decrease in monomer 132 is likely to occur. Therefore, by providing the blank region 135 between the core portion-forming regions 130, it is possible to suppress the deformation (warpage) of the entire workpiece 100.

In addition, the blank region 135 shown in FIG. 2 is also provided at a position surrounding the core portion-forming region 130.

By providing the blank region 135 at such a position, the workpiece 100 is supported by the blank region 135, so that the deformation of the entire workpiece 100 can be particularly suppressed. In addition, the entire edge portion of the core portion-forming region 130 is adjacent to the blank region 135. Therefore, the influence of the blank region 135 on the core portion-forming region 130 is uniform, and the variation in transmission loss between the channels is particularly small.

4. Modification Example

Next, a manufacturing method of an optical waveguide according to a modification example will be described.

Figure 16:
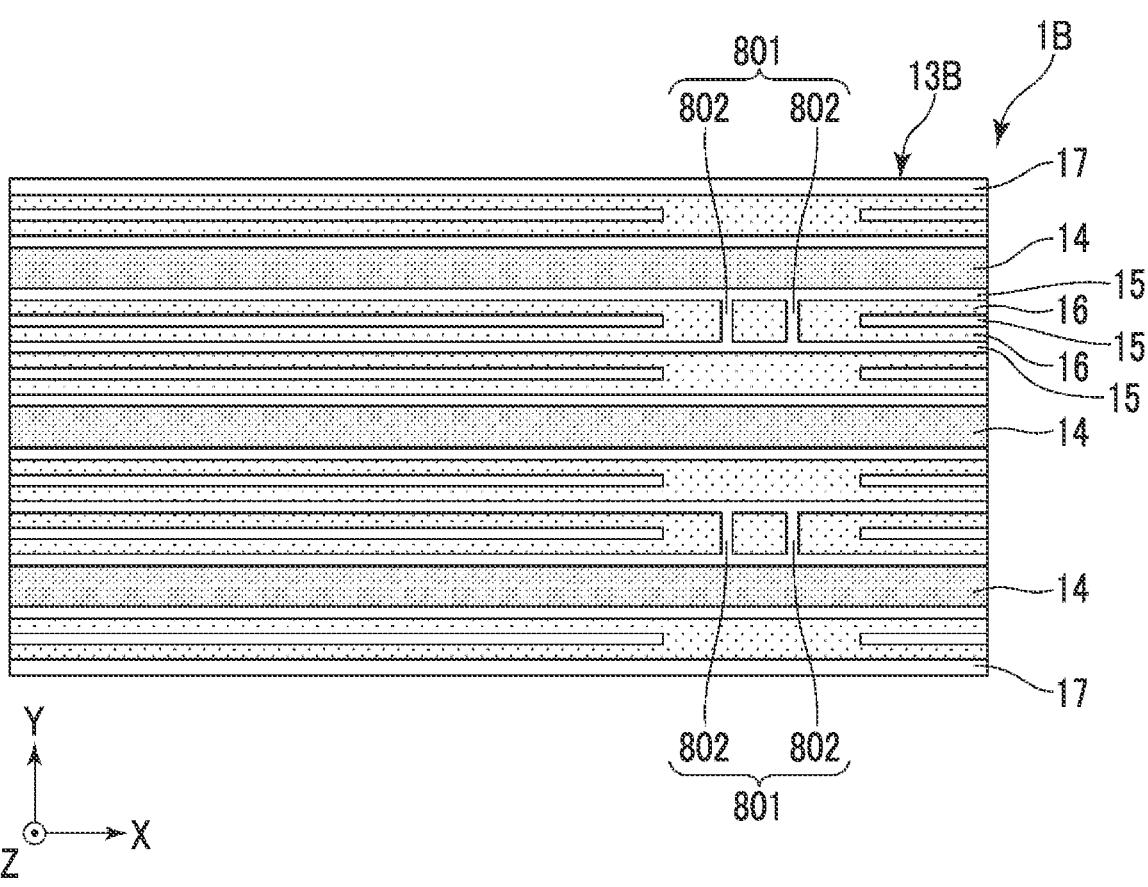
FIG. 16 is a plan view showing an optical waveguide manufactured by a manufacturing method of an optical waveguide according to a modification example.

FIG. 16 is a plan view showing an optical waveguide 1B manufactured by the manufacturing method of an optical waveguide according to the modification example.

Hereinafter, the modification example will be described, but in the following description, the differences from the above-described embodiment will be mainly described, and the same matters will be omitted. In each drawing, the same reference numerals are given to the same configurations as in the above-described embodiment.

The optical waveguide 1B shown in FIG. 16 is the same as the optical waveguide 1 shown in FIG. 2, except that a shape of the dummy core portion 16 is different and a first mark 801 is provided.

In the optical waveguide 1B, a width of at least one end portion of the dummy core portion 16 (second core portion)

is different from a width of the waveguide core portion 14. In the example of FIG. 16, at both end portions in the X-axis direction, the width of the dummy core portion 16 is approximately half the width of the waveguide core portion 14. Specifically, the dummy core portion 16 shown in FIG. 16 is a site which is divided into two by adding a new first side cladding portion 15 to a center of the width of the dummy core portion 16 shown in FIG. 2.

According to such a configuration, since the widths are different when viewed from an end surface of one end portion, the waveguide core portion 14 can be easily distinguished from the dummy core portion 16. Therefore, in a case where the waveguide core portion 14 and the optical component are optically connected, connection work is facilitated.

5. Mark

The optical waveguide 1B shown in FIG. 16 has the first mark 801 provided at a position overlapping the core portion-forming region 130. Specifically, in the optical waveguide 1B, there is a site in which the width of the dummy core portion 16 is equal to the width of the waveguide core portion 14, except for both end portions in the X-axis direction. The first mark 801 is provided at this site.

Since the first mark 801 is provided at the position overlapping the core portion-forming region 130, the first mark 801 is highly likely to be included in the optical waveguide 1. Therefore, the first mark 801 can be used as a position reference in a case where, for example, the optical connector is attached to the optical waveguide 1 and the optical waveguide 1 and the optical connector are aligned. As a result, accuracy of alignment can be improved. A usage method of the first mark 801 is not limited thereto. For example, the first mark 801 can be used as a position reference in a case where an optical path conversion unit such as a mirror is formed in the optical waveguide 1, in a case where an optical component is assembled in the optical waveguide 1, and the like.

In addition, the first mark 801 may be applied by a method such as printing and transfer. In the present modification example, a constituent material of the first mark 801 is the same material as the side cladding portion included in a core layer 13B. That is, the first mark 801 shown in FIG. 16 is provided with the dummy core portion 16 (second core portion) as a background, and has a low-refractive-index portion 802 having a refractive index lower than that of the dummy core portion 16. Specifically, the first mark 801 shown in FIG. 2 is composed of the low-refractive-index portion 802 crossing the dummy core portion 16.

According to such a configuration, the way the first mark 801 is seen in a case where the dummy core portion 16 is used as a background, for example, the way light passes through the first mark 801 can be changed. Accordingly, visibility of the first mark 801 can be improved.

In addition, since the low-refractive-index portion 802 is formed of the same material as the side cladding portion, the low-refractive-index portion 802 can be manufactured at the same time as the side cladding portion. Therefore, the first mark 801 having the low-refractive-index portion 802 is easily manufactured.

Furthermore, the low-refractive-index portion 802 can be formed according to the irradiated region 301 with the active radiation R. On the other hand, the waveguide core portion 14 and the dummy core portion 16 are also formed corresponding to the non-irradiated region 302 with the active radiation R. Therefore, a position accuracy of the first mark

801 with respect to the waveguide core portion 14 or the dummy core portion 16 is as high as a position accuracy of the irradiated region 301, and is very high.

A shape of the first mark 801 is not limited to the shape shown in the drawing, and may be any shape.

In addition, in the above-described manufacturing method of an optical waveguide, it is necessary to align the workpiece 100 with the device in the irradiation with the active radiation R and the cutting of the workpiece 100. The workpiece 100 shown in FIG. 1 has various marks used for the alignment.

The workpiece 100 shown in FIG. 2 has a second mark 803 provided at a position overlapping the blank region 135.

Since the second mark 803 is provided at a position overlapping the blank region 135, the second mark 803 can be used as a position reference in a case where the optical waveguide 1 is cut out from the workpiece 100. A usage method of the second mark 803 is not limited thereto. For example, before the cutting out, the second mark 803 can be used as a position reference with respect to the workpiece 100, in a case where an optical path conversion unit such as a mirror is formed in the optical waveguide 1, in a case where an optical component is assembled in the optical waveguide 1, and the like.

Figure 17:
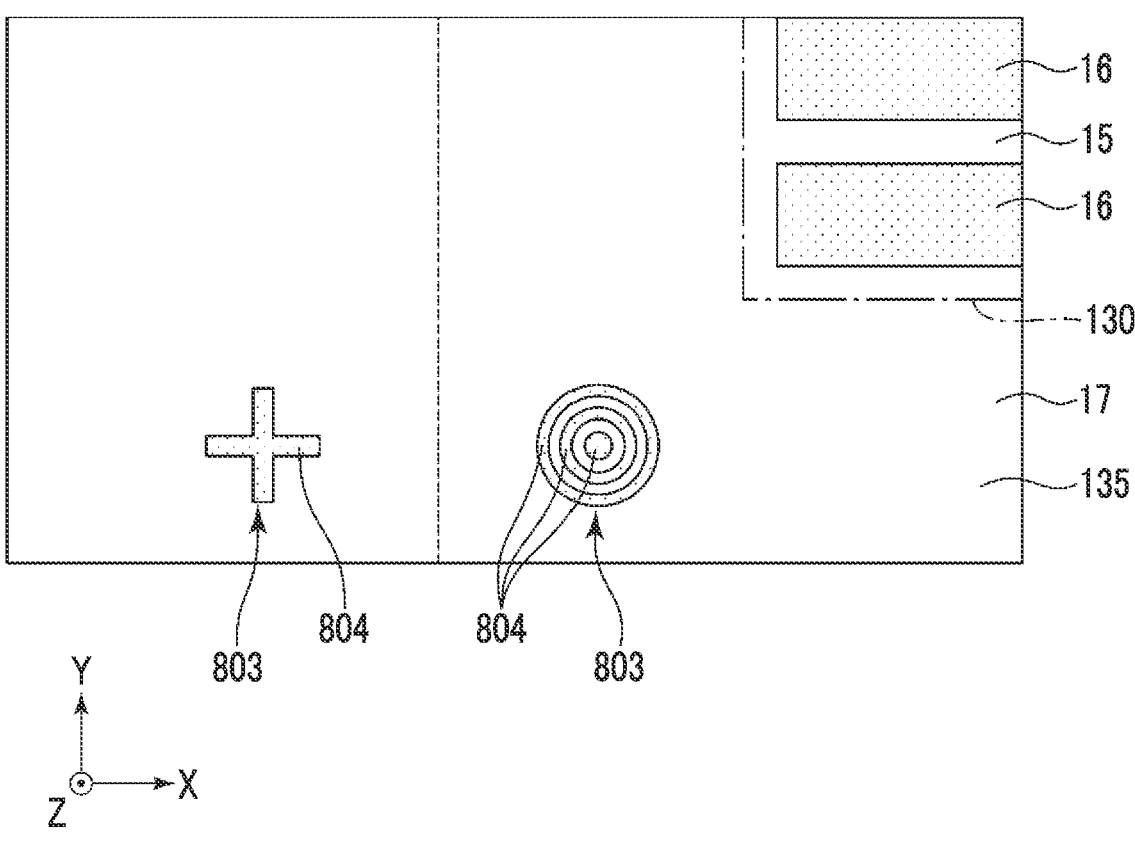
FIG. 17 is an enlarged view of a part E of FIG. 2.

FIG. 17 is an enlarged view of a part E of FIG. 2. FIG. 2 or 17 shows various examples of the second mark 803.

For example, in the workpiece 100 shown in FIG. 2, a cross-shaped mark as the second mark 803 is provided outside the unit 200 as shown in FIG. 17. In addition, as shown in FIG. 17, a concentric circular mark as the second mark 803 is provided inside the unit 200 shown in FIG. 2. Furthermore, inside the unit 200 shown in FIG. 2 and at the center of the width of the piece 300, a circular mark as the second mark 803 is provided as shown in FIG. 17.

The shape of the second mark 803 is not limited to the shape shown in the drawing, and may be any shape.

The blank region 135 shown in FIG. 2 includes the second side cladding portion 17 integrated with the first side cladding portion 15. In this case, the second mark 803 provided at the position overlapping the blank region 135 has a high-refractive-index portion 804 having a refractive index higher than that of the second side cladding portion 17, as shown in FIG. 17.

According to such a configuration, the way the second mark 803 is seen in a case where the second side cladding portion 17 is used as a background, for example, the way light passes through the second mark 803 can be changed. Accordingly, visibility of the second mark 803 can be improved.

In addition, in the present embodiment, a constituent material of the high-refractive-index portion 804 is the same material as that of the waveguide core portion 14 and the dummy core portion 16. Accordingly, it is possible to manufacture the high-refractive-index portion 804 at the same time as the waveguide core portion 14 and the dummy core portion 16. Therefore, the second mark 803 having the high-refractive-index portion 804 is easily manufactured.

Furthermore, the high-refractive-index portion 804 can be formed according to the non-irradiated region 302 with the active radiation R. On the other hand, the waveguide core portion 14 and the dummy core portion 16 are also formed corresponding to the non-irradiated region 302 with the active radiation R. Therefore, a position accuracy of the second mark 803 with respect to the waveguide core portion 14 and the dummy core portion 16 is as high as a position accuracy of the non-irradiated region 302, and is very high.

In addition, the number and arrangement of the units 200 and the pieces 300 in the workpiece 100 shown in FIG. 1 are not limited thereto.

The manufacturing method of an optical waveguide according to the present invention has been described above based on the embodiments shown in the drawings, but the present invention is not limited thereto.

For example, the manufacturing method of an optical waveguide according to the present invention may be a manufacturing method of an optical waveguide, in which a step for any purpose is added to the above-described embodiments.

EXAMPLES

Next, specific examples of the present invention will be described.

6. Manufacturing of Optical Waveguide for Evaluation

Figure 18:
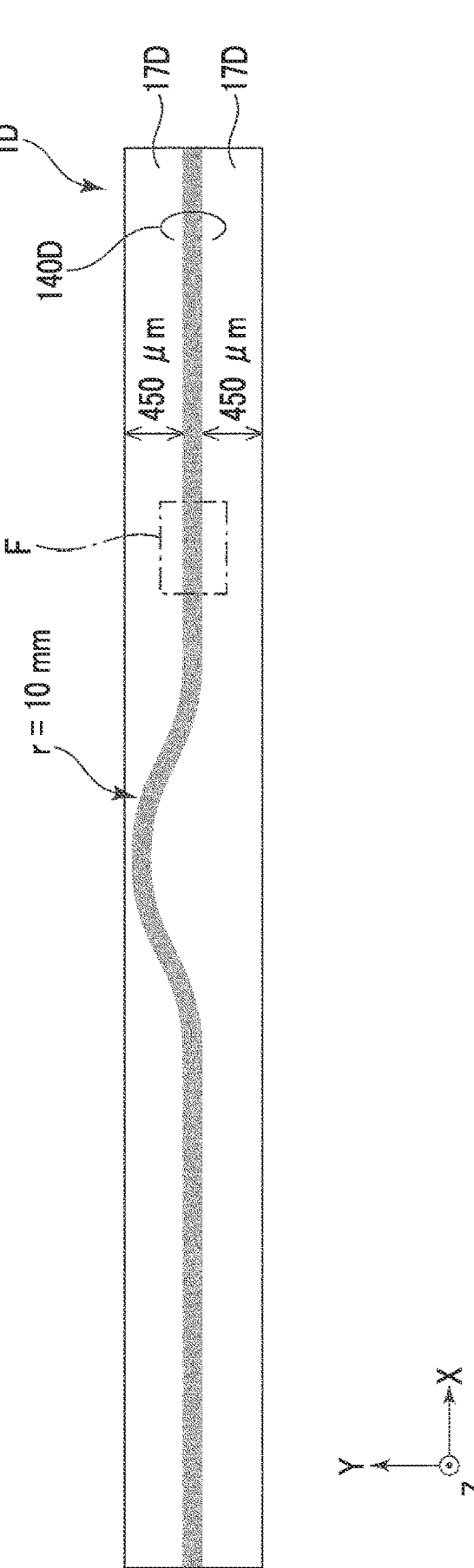
FIG. 18 is a plan view showing a core portion of an optical waveguide for evaluation.
Figure 19:
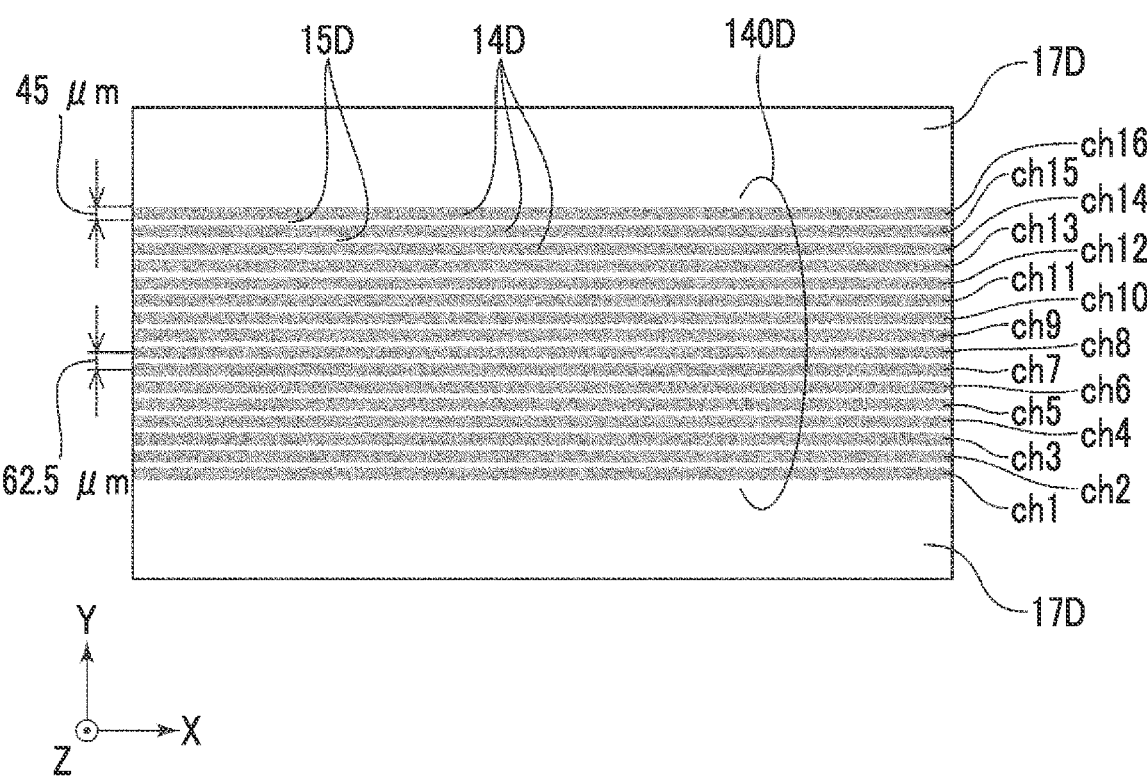
FIG. 19 is an enlarged view of a part F in FIG. 18.

FIG. 18 is a plan view showing a core portion of an optical waveguide 1D for evaluation. FIG. 19 is an enlarged view of a part F of FIG. 18.

In the optical waveguide 1D for evaluation shown in FIG. 18, 16 core portions 14D were arranged in parallel as shown in FIG. 19. In the following description, the 16 core portions 14D are also referred to as "core portion group 140D", and each core portion 14D is also referred to as "channel". In addition, the 16 channels are named ch1 to ch16.

In addition, the total length of the optical waveguide 1D for evaluation in the X-axis direction was 70 mm, the width of the core portion 14D in the Y-axis direction was 45 μm, and the pitch of the core portion 14D in the Y-axis direction was 62.5 μm. Therefore, the width of a first side cladding portion 15D located between the core portions 14D in the Y-axis direction was 17.5 μm. Second side cladding portions 17D having a width of 450 μm in the Y-axis direction were provided on both sides of the core portion group 140D in the Y-axis direction.

Furthermore, the core portion group 140D was curved in the middle in the X-axis direction. A bending radius r of the bending portion was 10 mm.

The above-described optical waveguide 1D for evaluation was manufactured by the above-described manufacturing method of an optical waveguide according to the embodiment. However, the cutting step was omitted. In a range occupied by the core portion group 140D of the optical waveguide 1D for evaluation, an area ratio of the core portions was 50% or more. In addition, a plurality of the core portions 14D (a plurality of core portions which could be used as dummy cores) were positioned at both ends of the core portion group 140D. Therefore, this range corresponds to the "core portion-forming region" in the above-described embodiment.

7. Evaluation of Optical Waveguide for Evaluation

An insertion loss of the obtained optical waveguide 1D for evaluation was measured. The insertion loss was measured for each channel according to the measurement method of the insertion loss specified in "test method of polymer optical waveguide (JPCA-PE02-05-01S-2008)", which is a standard of the Japan Electronics Packaging and Circuits Association (JPCA). In the measured insertion loss, a relative loss of each channel with respect to the lowest loss among the 16 channels was calculated. In addition, the same measurement and calculation were performed three times, and the calculation results of the three times were set to #1, #2, and #3. The calculation results are shown in FIG. 20.

Figure 20:
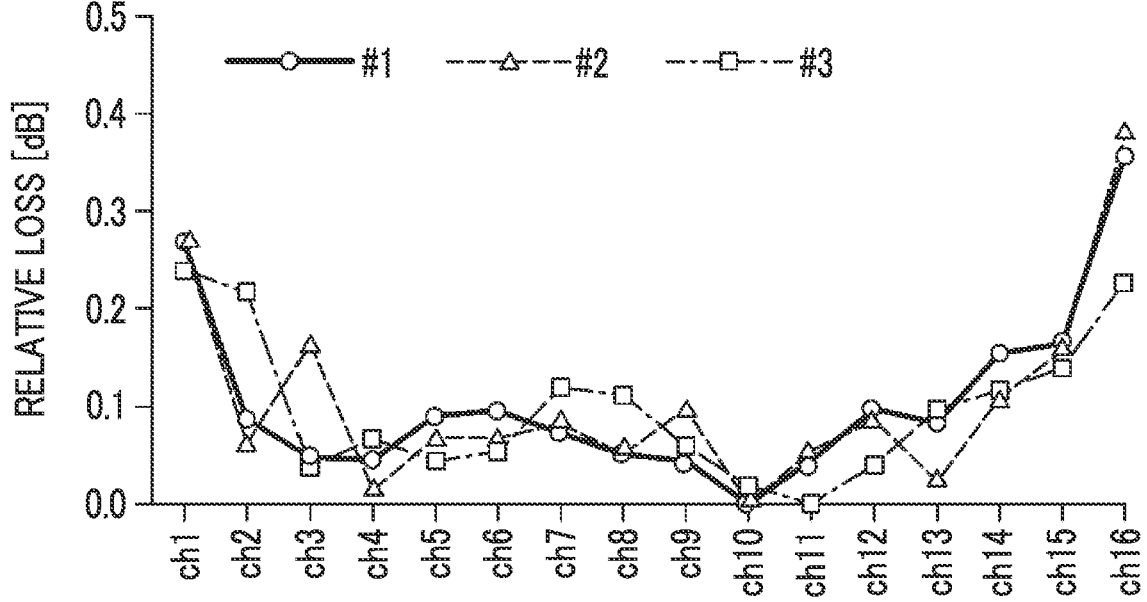
FIG. 20 is a graph showing relative losses for each channel in the optical waveguide for evaluation.

FIG. 20 is a graph showing relative losses for each channel in the optical waveguide for evaluation.

As is clear from FIG. 20, it was found that, in a case the relative losses were compared in the 16 channels, a tendency that the relative losses decreased from the end of the core portion group 140D, that is, from ch1 or ch16, toward the center of the core portion group 140D, that is, ch8 or ch9. Therefore, it can be said that the distribution of the relative loss in the core portion group 140D was U-shaped as a whole. Therefore, it was found that, in a case where the optical waveguide was cut out from the inside to avoid both ends of the core portion group 140D, it was possible to manufacture the optical waveguide in which the insertion loss of each channel was small and the variation in insertion loss between the channels was small.

In particular, in the range of ch3 to ch14, the relative loss was suppressed to 0.20 dB or less. From this result, it can be said that the transmission loss tended to deteriorate due to the influence of the outside of the core portion group 140D from the end of the core portion group 140D to the two channels. As the influence of the outside of the core portion group 140D, for example, the above-described "gradual decrease of the difference in refractive index" is considered.

Furthermore, in the range of ch4 to ch13, the relative loss was suppressed to 0.15 dB or less. On the other hand, in ch1 to ch3 and ch14 to ch16, the relative loss exceeded 0.15 dB.

From the above results, it was found that, in a case where the cutting line CL shown in FIG. 2 was set, it was advantageous to set the cutting line CL set from the outer edge of the core portion-forming region 130 to the inside by preferably two or more core portions and more preferably three or more core portions. By setting the cutting line CL at such a position, it was possible to manufacture an optical waveguide in which the influence of the "gradual decrease of the difference in refractive index" was suppressed. In other words, by cutting out a part of the core portions to remain on the workpiece side, the influence of the gradual decrease of the difference in refractive index was suppressed, and an optical waveguide having a small variation in transmission loss could be obtained. On the other hand, in a case where the cutting line CL was set outside the outer edge of the core portion-forming region 130, the cut-out optical waveguide was likely to be affected by the gradual decrease of the difference in refractive index. It can be said that the area ratio of the core portions in the core portion-forming region 130 described above was a threshold value at which the difference in the effects occurred.

INDUSTRIAL APPLICABILITY

According to the present invention, it is possible to manufacture an optical waveguide in which a variation of a transmission loss between channels is small. Accordingly, the present invention has industrial applicability.

| Reference Signs List |
| --- |
| 1: Optical waveguide |
| 1B: Optical waveguide |
| 1D: Optical waveguide for evaluation |
| 1X: Optical waveguide |
| 11: First cladding layer |
| 12: Second cladding layer |

-continued

| Reference Signs List |
| --- |
| 13: Core layer |
| 13B: Core layer |
| 13X: Core layer |
| 14: Waveguide core portion |
| 14D: Core portion |
| 15: First side cladding portion |
| 15D: First side cladding portion |
| 16: Dummy core portion |
| 17: Second side cladding portion |
| 17D: Second side cladding portion |
| 18: First cover layer |
| 19: Second cover layer |
| 100: Workpiece |
| 100X: Workpiece |
| 130: Core portion-forming region |
| 130X: Core portion-forming region for comparison |
| 131: Polymer |
| 132: Monomer |
| 135: Blank region |
| 140D: Core portion group |
| 160: Core forming layer |
| 170: Clad forming layer |
| 200: Unit |
| 300: Piece |
| 301: Irradiated region |
| 302: Non-irradiated region |
| 303: Photomask |
| 304: Direct drawing exposure machine |
| 500: Substrate |
| 600: Core film |
| 701: Cladding film |
| 702: Cladding film |
| 801: First mark |
| 802: Low-refractive-index portion |
| 803: Second mark |
| 804: High-refractive-index portion |
| CL: Cutting line |
| DB: Dicing blade |
| R: Active radiation |
| S100: Member preparation step |
| S102: Core layer formation step |
| S104: Cladding layer formation step |
| S106: Workpiece preparation step |
| S108: Cutting step |
| n: Refractive index |
| n1: Refractive index |
| n2: Refractive index |
| r: Bending radius |

What is claim is:

1. A manufacturing method of an optical waveguide, comprising:

a step of preparing a workpiece which includes a core layer including a core portion-forming region and has a sheet shape;

wherein the core layer satisfies all of the following requirements (a), (b), and (c), (a) the core layer contains a polymer and a monomer, and has a refractive index distribution based on a difference in concentration of the monomer or a difference in concentration of a structure derived from the monomer, (b) the core portion-forming region includes a plurality of first core portions, second core portions provided on both sides of the first core portion, and a first side cladding portion provided between the first core portion and the second core portion, and the core portion-forming region further includes a plurality of second core portions positioned at opposite ends of the core portion-forming region in a direction perpendicular to a longitudinal direction of the first and second core portions, (c) the core portion-forming region is a region where a total area ratio occupied by the first core portion and the second core portion is 50% or more in a 1 mm-square range, and a step of cutting out an optical waveguide from an inside of the core portion-forming region in the workpiece so as to avoid at least two of the second core portions positioned at each of the opposite ends of the core portion-forming region.

2. The manufacturing method of an optical waveguide according to claim 1, wherein a width of at least one end portion of the second core portion is different from a width of the first core portion.

3. The manufacturing method of an optical waveguide according to claim 1, wherein the optical waveguide has a first mark provided at a position overlapping the core portion-forming region.

4. The manufacturing method of an optical waveguide according to claim 3, wherein the first mark has a low-refractive-index portion having a refractive index lower than a refractive index of the second core portion.

5. The manufacturing method of an optical waveguide according to claim 1, wherein the core layer includes a plurality of the core portion-forming regions which are separated from each other, and a blank region which is positioned between adjacent core portion-forming regions and does not satisfy the requirement (c).

6. The manufacturing method of an optical waveguide according to claim 5, wherein the blank region is further provided to surround the core portion-forming regions.

7. The manufacturing method of an optical waveguide according to claim 5, wherein the optical waveguide has a second mark provided at a position overlapping the blank region.

8. The manufacturing method of an optical waveguide according to claim 7, wherein the blank region includes a second side cladding portion integrated with the first side cladding portion, and the second mark has a high-refractive-index portion having a refractive index higher than a refractive index of the second side cladding portion.

9. The manufacturing method of an optical waveguide according to claim 6, wherein the optical waveguide has a second mark provided at a position overlapping the blank region.

10. The manufacturing method of an optical waveguide according to claim 1, wherein the step of cutting out the optical waveguide is performed so as to avoid at least three of the second core portions positioned at each of the opposite ends of the core portion-forming region.

11. The manufacturing method of an optical waveguide according to claim 1, wherein a transmission loss of each of the first and second core portions included in the cut-out optical waveguide is 0.20 dB or less.

12. The manufacturing method of an optical waveguide according to claim 11, wherein the transmission loss is 0.15 dB or less.

* * * * *